US012804110B2

(12) United States Patent
Takeuchi et al.

(10) Patent No.: US 12,804,110 B2
(45) Date of Patent: Nov. 17, 2026

(54) PROJECTION IMAGE ADJUSTMENT METHOD, PROJECTION SYSTEM, AND NON-TRANSITORY COMPUTER-READABLE STORAGE MEDIUM STORING INFORMATION PROCESSING PROGRAM

(71) Applicant: SEIKO EPSON CORPORATION, Tokyo (JP)

(72) Inventors: Kota Takeuchi, Azumino (JP); Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 420 days.

(21) Appl. No.: 18/385,028

(22) Filed: Oct. 30, 2023

(65) Prior Publication Data

US 2024/0146885 A1 May 2, 2024

(30) Foreign Application Priority Data

Oct. 31, 2022 (JP) ................................ 2022-174172

(51) Int. Cl.
*G03B 21/14* (2006.01)
*H04N 9/31* (2006.01)

(52) U.S. Cl.
CPC ......... *H04N 9/3147* (2013.01); *H04N 9/3185* (2013.01); *H04N 9/3194* (2013.01)

(58) Field of Classification Search
CPC .. H04N 9/3185; H04N 9/3147; G03B 21/147; G03B 21/14
See application file for complete search history.

(56) References Cited

U.S. PATENT DOCUMENTS

2005/0012907 A1 1/2005 Inoue
2010/0053569 A1 3/2010 Furui
2010/0103386 A1 4/2010 Kubota
2013/0201457 A1* 8/2013 Watanabe ............ G03B 21/147 353/69
2014/0111536 A1 4/2014 Shinozaki
2015/0055099 A1* 2/2015 Kim ....................... G03B 37/04 353/30
2018/0018761 A1 1/2018 Tanaka et al.

FOREIGN PATENT DOCUMENTS

JP 2005-039558 A 2/2005
JP 2010-050540 A 3/2010
JP 2011-217403 A 10/2011
JP 2016-189560 A 11/2016
JP 2017-169204 A 9/2017

* cited by examiner

*Primary Examiner* — Ryan D Howard
(74) *Attorney, Agent, or Firm* — Oliff PLC

(57) ABSTRACT

A first display panel has a first side orthogonal to a first axis. A projection image adjustment method includes: acquiring, based on calculation data, a normal direction of a projection surface; acquiring, based on the calculation data, a first direction corresponding to the first axis and parallel to a second axis in a first projection image projected onto the projection surface; acquiring a second direction orthogonal to the normal direction and the first direction; adjusting a shape of a second projection image including a portion of a rectangular first display image including a second side orthogonal to the first direction and a third side orthogonal to the second direction such that the first display image is displayed on the projection surface; and projecting the second projection image from a first projector onto the projection surface.

6 Claims, 12 Drawing Sheets

PROJECTION IMAGE ADJUSTMENT METHOD, PROJECTION SYSTEM, AND NON-TRANSITORY COMPUTER-READABLE STORAGE MEDIUM STORING INFORMATION PROCESSING PROGRAM

The present application is based on, and claims priority from JP Application Serial Number 2022-174172, filed Oct. 31, 2022, the disclosure of which is hereby incorporated by reference herein in its entirety.

BACKGROUND

1. Technical Field

The present disclosure relates to a projection image adjustment method, a projection system, and a non-transitory computer-readable storage medium storing an information processing program.

2. Related Art

When a projector projects a projection image onto a projection surface to display a display image, a range of the projection image on the projection surface may distort into a trapezoidal shape due to a relative positional relationship between the projector and the projection surface. A technique for correcting such trapezoidal distortion is used in related art.

For example, JP-A-2011-217403 (PTL 1) discloses a technique of correcting the above-described trapezoidal distortion by projecting a distance detection pattern from a projector onto a projection surface to calculate a distance between the projector and the projection surface and calculating an inclination of the projector with respect to the projection surface.

However, in the technique according to PTL 1, when a projection image is projected onto the projection surface, rotation of the projection image within the projection surface as viewed from the projector is not considered. Therefore, in the technique according to PTL 1, there is a possibility that the projection image after correction is displayed as a display image in a state of being rotated within the projection surface.

SUMMARY

A projection image adjustment method according to a first aspect of the disclosure includes: acquiring measurement data obtained by measuring a three-dimensional shape of a projection surface onto which a first projection image is projected from a first projector including a rectangular first display panel having a first side orthogonal to a first axis; calculating, based on the acquired measurement data, a parameter related to the three-dimensional shape; acquiring, based on the parameter, a normal direction of the projection surface; acquiring, based on the parameter, a first direction corresponding to the first axis and parallel to a second axis in the first projection image; acquiring a second direction orthogonal to the normal direction and the first direction; adjusting, on the projection surface, a shape of a second projection image including a portion of a rectangular first display image having a second side orthogonal to the first direction and a third side orthogonal to the second direction; and projecting the second projection image from the first projector onto the projection surface.

A projection system according to a second aspect of the disclosure includes: a first projector including a rectangular first display panel having a first side orthogonal to a first axis; a sensor configured to measure a three-dimensional shape of a projection surface onto which the first projector projects a first projection image; and an information processing apparatus configured to calculate, based on measurement data acquired from the sensor, a parameter related to the three-dimensional shape, acquire, based on the parameter, a normal direction of the projection surface, acquire, based on the parameter, a first direction corresponding to the first axis and parallel to a second axis in the first projection image, acquire a second direction orthogonal to the normal direction and the first direction, adjust, on the projection surface, a shape of a second projection image including a portion of a rectangular first display image having a second side orthogonal to the first direction and a third side orthogonal to the second direction, and project the second projection image from the first projector onto the projection surface.

A non-transitory computer-readable storage medium according to a third aspect of the disclosure stores an information processing program, the information processing program includes: causing a computer to calculate, based on measurement data acquired from a sensor that measures a three-dimensional shape of a projection surface onto which a first projection image is projected by a first projector including a rectangular first display panel having a first side orthogonal to a first axis, a parameter related to the three-dimensional shape, acquire, based on the parameter, a normal direction of the projection surface, acquire, based on the parameter, a first direction corresponding to the first axis and parallel to a second axis in the first projection image, acquire a second direction orthogonal to the normal direction and the first direction, adjust, on the projection surface, a shape of a second projection image including a portion of a rectangular first display image having a second side orthogonal to the first direction and a third side orthogonal to the second direction, and project the second projection image from the first projector onto the projection surface.

DESCRIPTION OF EMBODIMENTS

Hereinafter, an embodiment of the disclosure will be described with reference to the drawings. However, in each drawing, dimensions and scale of each part are different from an actual one as appropriate. Since the embodiment described below is a preferred specific example of the present disclosure, various technical limitations are given, but the scope of the disclosure is not limited to this embodiment unless there is a description that the disclosure is particularly limited in the following description.

1: First Embodiment

1-1: Overall Configuration

Figure 1:
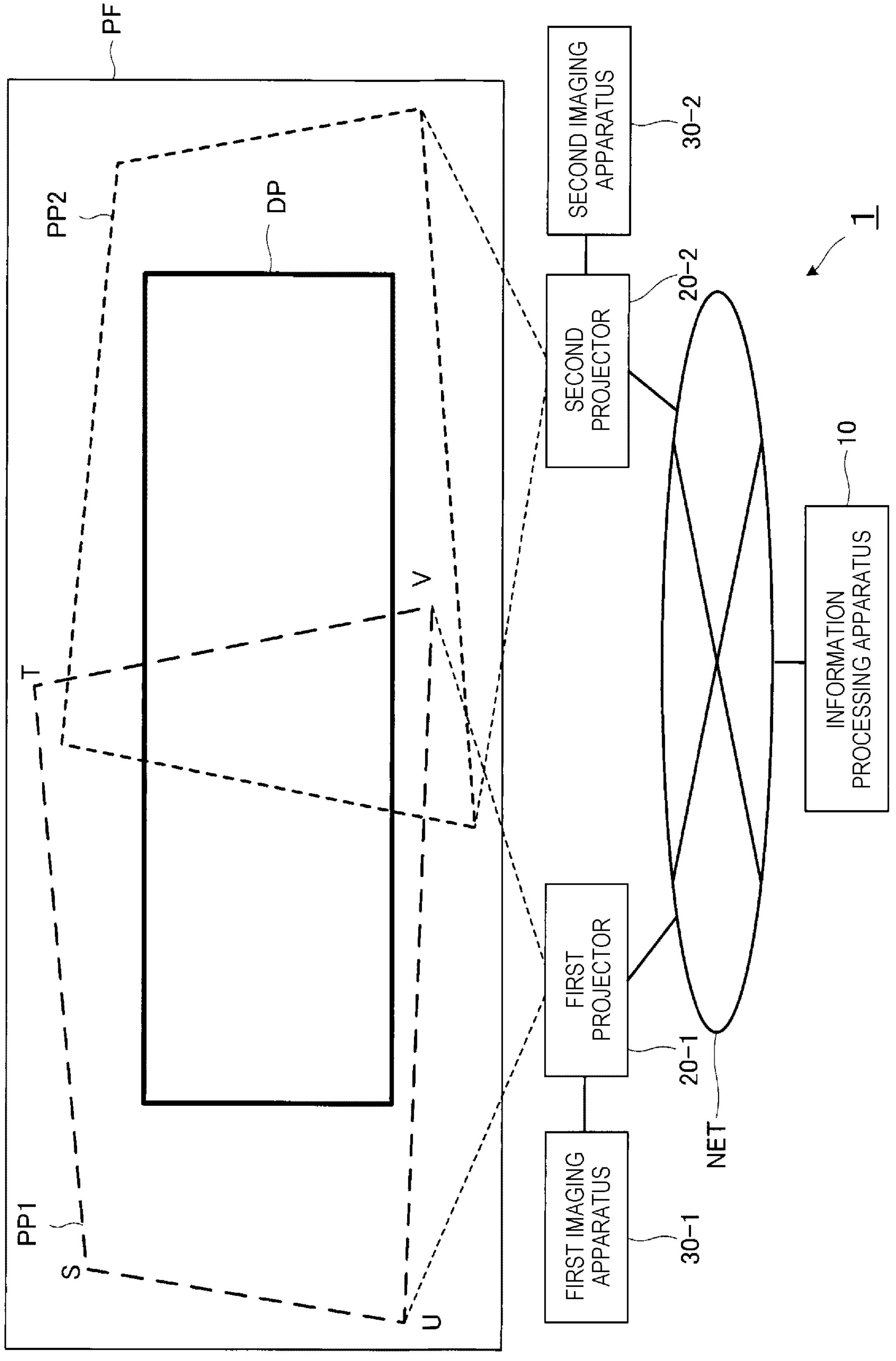
FIG. 1 is a block diagram showing a configuration of a projection system 1.

FIG. 1 is a block diagram showing a configuration of a projection system 1 according to a first embodiment. The projection system 1 includes an information processing apparatus 10, a first projector 20-1, a second projector 20-2, a first imaging apparatus 30-1, and a second imaging apparatus 30-2. The information processing apparatus 10, the first projector 20-1, and the second projector 20-2 are communicably connected via a communication network NET. The first imaging apparatus 30-1 and the first projector 20-1 are communicably connected. A captured image captured by the first imaging apparatus 30-1 is output to the information processing apparatus 10 via the first projector 20-1. Similarly, the second imaging apparatus 30-2 and the second projector 20-2 are communicably connected. A captured image captured by the second imaging apparatus 30-2 is output to the information processing apparatus 10 via the second projector 20-2. The first imaging apparatus 30-1 may also be connected to the communication network NET instead of being directly connected to the first projector 20-1. In this case, the captured image captured by the first imaging apparatus 30-1 is output to the information processing apparatus 10 via the communication network NET. Similarly, the second imaging apparatus 30-2 may also be connected to the communication network NET instead of being directly connected to the second projector 20-2. In this case, the captured image captured by the second imaging apparatus 30-2 is output to the information processing apparatus 10 via the communication network NET.

The first projector 20-1 and the second projector 20-2 each display a display image by projecting a projection image onto a projection surface such as a wall surface or a screen. In the present embodiment, the first projector 20-1 and the second projector 20-2 execute tiling display. Specifically, the first projector 20-1 projects a projection image PP1 onto a projection surface PF. The second projector 20-2 projects a projection image PP2 onto the projection surface PF. On the projection surface PF, the projection image PP1 and the projection image PP2 partially overlap each other. A single display image DP is displayed in an entire region that is a sum of a region of the projection image PP1 and a region of the projection image PP2. A part of the display image DP is contained in the projection image PP1, and another part thereof is contained in the projection image PP2. The part of the display image DP contained in the projection image PP1 and the part of the display image DP contained in the projection image PP2 are partially superimposed, and thus the single display image DP is displayed on the projection surface PF.

In the present embodiment, it is assumed that the first projector 20-1 and the second projector 20-2 are placed substantially horizontally.

The first imaging apparatus 30-1 captures an image of the projection surface PF. Similarly, the second imaging apparatus 30-2 captures an image of the projection surface PF. The information processing apparatus 10 can acquire a three-dimensional shape of the projection surface PF based on the captured image of the projection surface PF captured by the first imaging apparatus 30-1 and the captured image of the projection surface PF captured by the second imaging apparatus 30-2. That is, it can be said that the first imaging apparatus 30-1 and the second imaging apparatus 30-2 measure the three-dimensional shape of the projection surface PF as one sensor 30. The information processing apparatus 10 may acquire the three-dimensional shape of the projection surface PF by using one stereo camera or one time-of-flight (TOF) camera instead of the first imaging apparatus 30-1 and the second imaging apparatus 30-2.

The information processing apparatus 10 adjusts, using measurement data on the three-dimensional shape of the projection surface PF, an outer shape of the projection image PP1 projected from the first projector 20-1 and an outer shape of the projection image PP2 projected from the second projector 20-2. As a result, the display image DP is displayed without being rotated within the projection surface PF. In particular, in the present embodiment, when the display image DP is rectangular, the display image DP has one side orthogonal to a vertical direction in the projection surface PF and another side orthogonal to a horizontal direction in the projection surface PF.

1-2: Configuration of Projector

Figure 2:
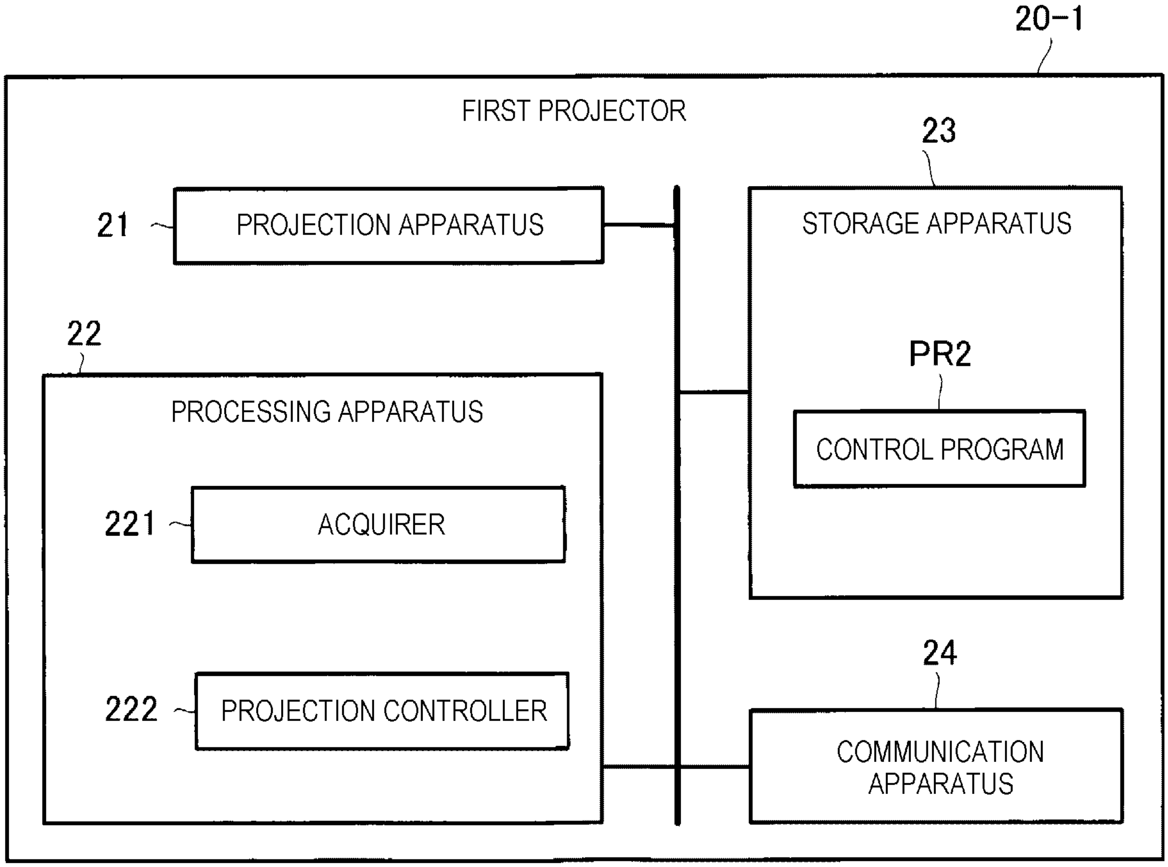
FIG. 2 is a block diagram showing a configuration of a first projector 20-1.

FIG. 2 is a block diagram showing a configuration of the first projector 20-1. The first projector 20-1 includes a projection apparatus 21, a processing apparatus 22, a storage apparatus 23, and a communication apparatus 24. Elements of the first projector 20-1 are coupled to each other by a single bus or a plurality of buses for information communication. In addition, each element of the first projector 20-1 may be implemented by a single device or a plurality of devices, and a part of elements of the first projector 20-1 may be omitted. The second projector 20-2 is implemented in the same manner as the first projector 20-1 and thus is not shown.

The projection apparatus 21 is an apparatus that projects the projection image PP1 acquired by an acquirer 221 to be described later from the information processing apparatus 10 onto the projection surface PF such as a wall or a screen. The projection apparatus 21 projects various images under control of the processing apparatus 22. As will be described later with reference to FIG. 3, the projection apparatus 21 includes, for example, an illumination apparatus 240, a liquid crystal panel 260, and a projection lens system 283, and modulates light from the illumination apparatus 240 using the liquid crystal panel 260. The projection apparatus 21 projects the modulated light onto the projection surface PF via the projection lens system 283.

The processing apparatus 22 is a processor that controls the entire first projector 20-1 and includes, for example, a single chip or a plurality of chips. The processing apparatus 22 is implemented by a central processing unit (CPU) including, for example, an interface for a peripheral apparatus, an arithmetic apparatus, and a register. A part or all of functions of the processing apparatus 22 may be implemented by hardware such as a digital signal processor (DSP), an application-specific integrated circuit (ASIC), a programmable logic device (PLD), or a field programmable gate array (FPGA). The processing apparatus 22 executes various types of processing in parallel or sequentially.

The storage apparatus 23 is a recording medium readable by the processing apparatus 22 and stores a plurality of programs including a control program PR2 executed by the processing apparatus 22. The storage apparatus 23 may include, for example, at least one of a read-only memory (ROM), an erasable programmable ROM (EPROM), an electrically erasable programmable ROM (EEPROM), and a random access memory (RAM). The storage apparatus 23 may be referred to as a register, a cache, a main memory, or a main storage apparatus.

The communication apparatus 24 is hardware serving as a transmission and reception device for communicating with another apparatus. The communication apparatus 24 is also referred to as, for example, a network device, a network controller, a network card, or a communication module. The communication apparatus 24 may include a connector for wired connection and an interface circuit corresponding to the connector. The communication apparatus 24 may include a wireless communication interface. Examples of the connector for wired connection and the interface circuit include those conforming to a wired local area network (LAN), IEEE 1394, and a universal serial bus (USB). Examples of the wireless communication interface include those conforming to a wireless LAN or Bluetooth (registered trademark).

Figure 3:
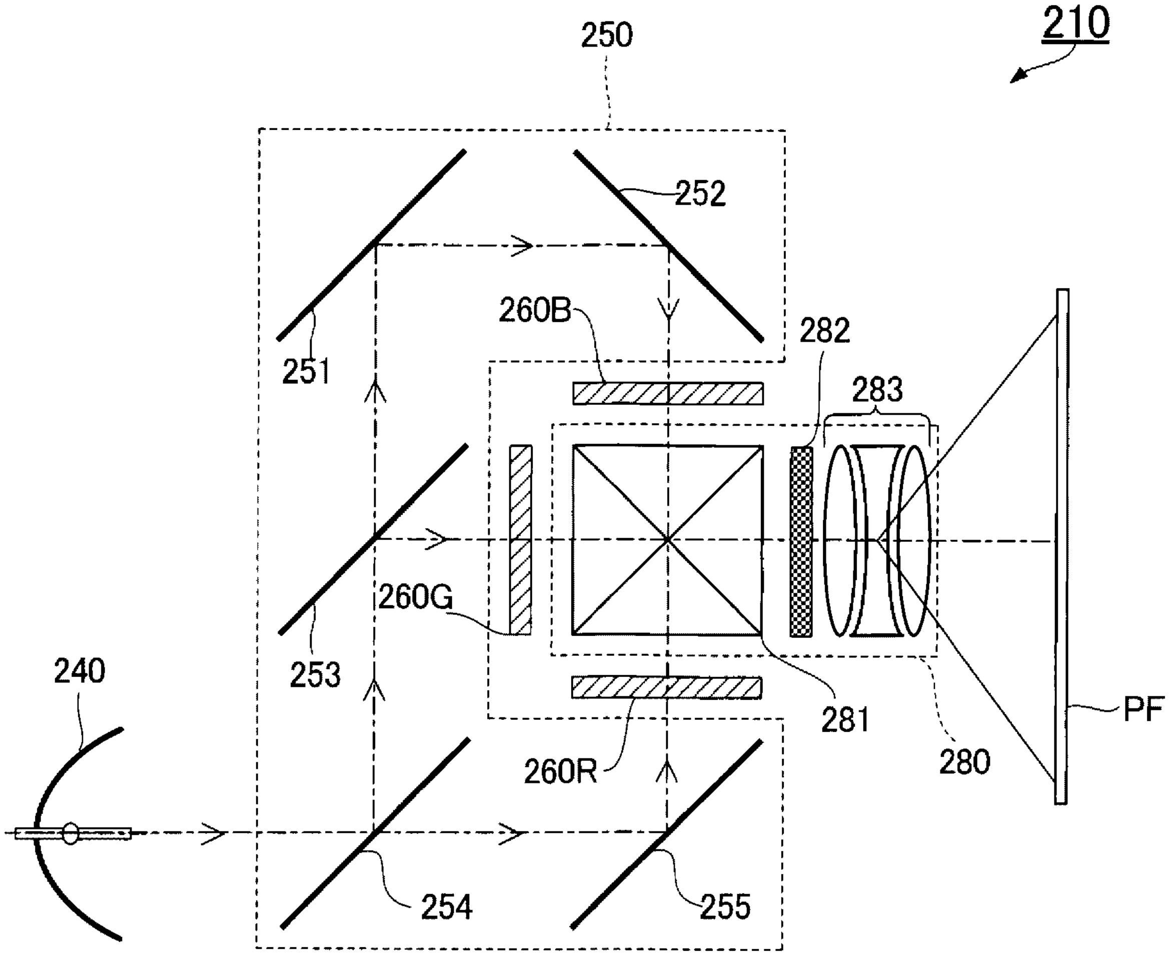
FIG. 3 is a diagram illustrating an example of an optical system 210.

FIG. 3 is a diagram illustrating an example of an optical system 210 provided in the projection apparatus 21. The optical system 210 includes the illumination apparatus 240, a separation optical system 250, three liquid crystal panels 260R, 260G, and 260B, and a projection optical system 280. Hereinafter, the liquid crystal panels 260R, 260G, and 260B may be collectively referred to as the liquid crystal panel 260. The liquid crystal panel 260 is an example of a "display panel". In particular, the liquid crystal panel 260 provided in the first projector 20-1 is an example of a "first display panel". The liquid crystal panel 260 provided in the second projector 20-2 is an example of a "second display panel". Further, the liquid crystal panel 260 serving as the first display panel has a rectangular shape having a side orthogonal to an axis in a vertical direction of the liquid crystal panel 260 and corresponding to an axis in the vertical direction on the projection surface PF. The "axis in the vertical direction of the liquid crystal panel 260 as the first display panel" is an example of a "first axis". The side orthogonal to the "first axis" is an example of a "first side". Similarly, the liquid crystal panel 260 serving as the second display panel has a rectangular shape having a side orthogonal to the axis in the vertical direction of the liquid crystal panel 260 and corresponding to the axis in the vertical direction on the projection surface PF. The "axis in the vertical direction of the liquid crystal panel 260 as the second display panel" is an example of a "third axis". The side orthogonal to the "third axis" is an example of an "eleventh side".

The illumination apparatus 240 includes a white light source such as a halogen lamp.

The separation optical system 250 includes three mirrors 251, 252, and 255, and dichroic mirrors 253 and 254 therein. The separation optical system 250 separates white light that is visible light emitted from the illumination apparatus 240 into three primary colors, that is, red, green, and blue. Hereinafter, "red" is referred to as "R", "green" is referred to as "G", and "blue" is referred to as "B".

For example, the white light emitted from the illumination apparatus 240 is separated, by the mirrors 251, 252, and 255, and the dichroic mirrors 253 and 254 disposed inside the separation optical system 250, into light components of three primary colors, that is, light in an R wavelength range, light in a G wavelength range, and light in a B wavelength range. The light in the R wavelength range is guided to the liquid crystal panel 260R, the light in the G wavelength range is guided to the liquid crystal panel 260G, and the light in the B wavelength range is guided to the liquid crystal panel 260B.

Specifically, the dichroic mirror 254 transmits the light in the R wavelength range and reflects the light in the G and B wavelength ranges in the white light. The dichroic mirror 253 transmits the light in the B wavelength range and reflects the light in the G wavelength range in the light in the G and B wavelength ranges reflected by the dichroic mirror 254.

Here, each of the liquid crystal panels 260R, 260G, and 260B is used as a spatial light modulator. Each of the liquid crystal panels 260R, 260G, and 260B includes, for example, 800 columns of data lines, 600 rows of scanning lines, and pixels arranged in a matrix of horizontally 800 columns and vertically 600 rows. In each pixel, a polarization state of transmission light, which is emission light with respect to incident light, is controlled according to gradation. The numbers of scanning lines, data lines, and pixels of the liquid crystal panels 260R, 260G, and 260B described above are merely examples, and the numbers are not limited to the examples described above.

The projection optical system 280 includes a dichroic prism 281, an optical path shift element 282, and the projection lens system 283. The light modulated by the liquid crystal panels 260R, 260G, and 260B is incident on the dichroic prism 281 from three directions. In the dichroic prism 281, the light in the R wavelength range and the light in the B wavelength range are refracted at 90 degrees, whereas the light in the G wavelength range travels straight forward. Accordingly, images of the primary colors of R, G, and B are synthesized.

The light emitted from the dichroic prism 281 passes through the optical path shift element 282 and reaches the projection lens system 283. For example, the optical path shift element 282 is disposed between the dichroic prism 281 and the projection lens system 283.

The projection lens system 283 magnifies and projects the light emitted from the optical path shift element 282, specifically, the synthesized image onto the projection surface PF such as a screen. The liquid crystal panels 260R, 260G, and 260B receive, through the dichroic mirrors 253 and 254, the corresponding light corresponding to the primary colors of R, G, and B respectively.

The optical system 210 shown in FIG. 3 is merely an example. The optical system 210 may include, for example, a DMD panel instead of the liquid crystal panel 260. In this case, the DMD panel is an example of the "display panel". A DMD panel provided in the first projector 20-1 is an example of the "first display panel", and a DMD panel provided in the second projector 20-2 is an example of the "second display panel".

In FIG. 2, the processing apparatus 22 functions as the acquirer 221 and a projection controller 222 by reading and executing the control program PR2 from the storage apparatus 23. The control program PR2 may be transmitted, via the communication network NET, from another apparatus such as a server that manages the first projector 20-1.

The acquirer 221 acquires, via the communication apparatus 24, the projection image PP1 from the information processing apparatus 10.

The projection controller 222 causes the projection apparatus 21 to project the projection image PP1 acquired by the acquirer 221 onto a wall or a screen.

Although not shown, the first projector 20-1 has other functions provided in a normal projector.

1-3: Configuration of Information Processing Apparatus

Figure 4:
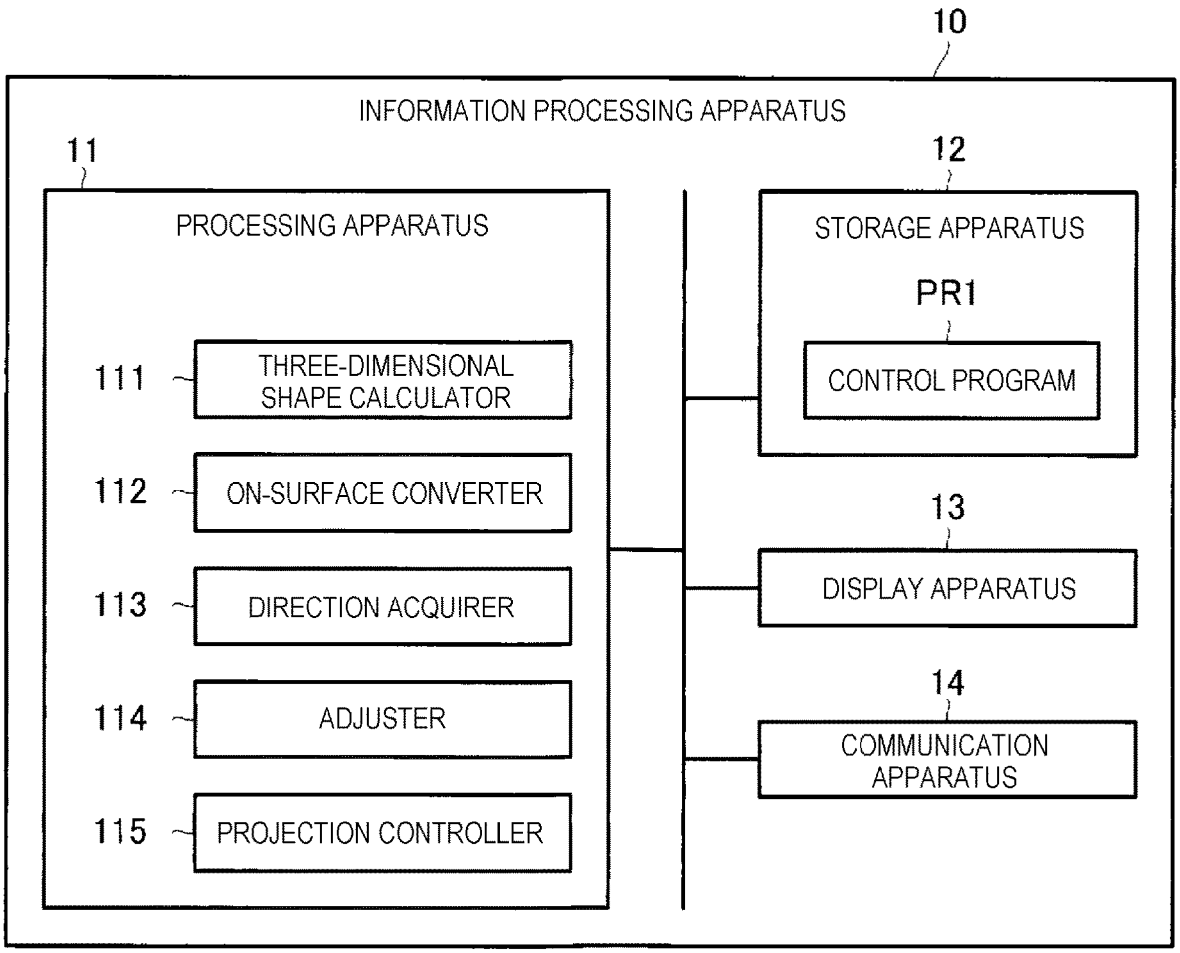
FIG. 4 is a block diagram showing a configuration example of an information processing apparatus 10.

FIG. 4 is a block diagram showing a configuration example of the information processing apparatus 10. The information processing apparatus 10 is typically a PC, but is not limited thereto, and may be, for example, a tablet terminal or a smartphone. The information processing apparatus 10 includes a processing apparatus 11, a storage apparatus 12, a display apparatus 13, and a communication apparatus 14. Elements of the information processing apparatus 10 are coupled to each other by a single bus or a plurality of buses for information communication.

The processing apparatus 11 is a processor that controls the entire information processing apparatus 10 and includes, for example, a single chip or a plurality of chips. The processing apparatus 11 is implemented by a CPU including, for example, an interface for a peripheral apparatus, an arithmetic apparatus, and a register. A part or all of functions of the processing apparatus 11 may be implemented by hardware such as a DSP, an ASIC, a PLD, or an FPGA. The processing apparatus 11 executes various types of processing in parallel or sequentially.

The storage apparatus 12 is a recording medium readable and writable by the processing apparatus 11 and stores a plurality of programs including a control program PR1 executed by the processing apparatus 11. The storage apparatus 12 may store images projected by the first projector 20-1 and the second projector 20-2. Further, the storage apparatus 12 may store layout information on disposition of the first projector 20-1 and the second projector 20-2. The storage apparatus 12 may include, for example, at least one of a ROM, an EPROM, an EEPROM, and a RAM. The storage apparatus 12 may be referred to as a register, a cache, a main memory, or a main storage apparatus.

The display apparatus 13 is a device that displays images and character information. The display apparatus 13 displays various images under control of the processing apparatus 11. For example, various display panels such as a liquid crystal display panel and an organic electro-luminescence (EL) display panel are suitably used as the display apparatus 13.

The communication apparatus 14 is hardware serving as a transmission and reception device for communicating with another apparatus. The communication apparatus 14 is also referred to as, for example, a network device, a network controller, a network card, or a communication module. The communication apparatus 14 may include a connector for wired connection and an interface circuit corresponding to the connector. The communication apparatus 14 may include a wireless communication interface. Examples of the connector for wired connection and the interface circuit include those conforming to a wired LAN, IEEE 1394, and a USB. Examples of the wireless communication interface include those conforming to a wireless LAN or Bluetooth (registered trademark).

By reading and executing the control program PR1 from the storage apparatus 12, the processing apparatus 11 functions as a three-dimensional shape calculator 111, an on-surface converter 112, a direction acquirer 113, an adjuster 114, and a projection controller 115. The control program PR1 may be transmitted, via the communication network NET, from another apparatus such as a server that manages the information processing apparatus 10.

The three-dimensional shape calculator 111 calculates a parameter on the three-dimensional shape of the projection surface PF viewed from the first imaging apparatus 30-1. In other words, the three-dimensional shape calculator 111 calculates and acquires a three-dimensional plane parameter of the projection surface PF relative to the first imaging apparatus 30-1. The "three-dimensional plane parameter of the projection surface PF" refers to coefficients a, b, and c when the projection surface PF is expressed by an expression $ax+by+cz=1$ in a three-dimensional coordinate system that is an xyz coordinate system on the captured image captured by the first imaging apparatus 30-1.

Figure 5:
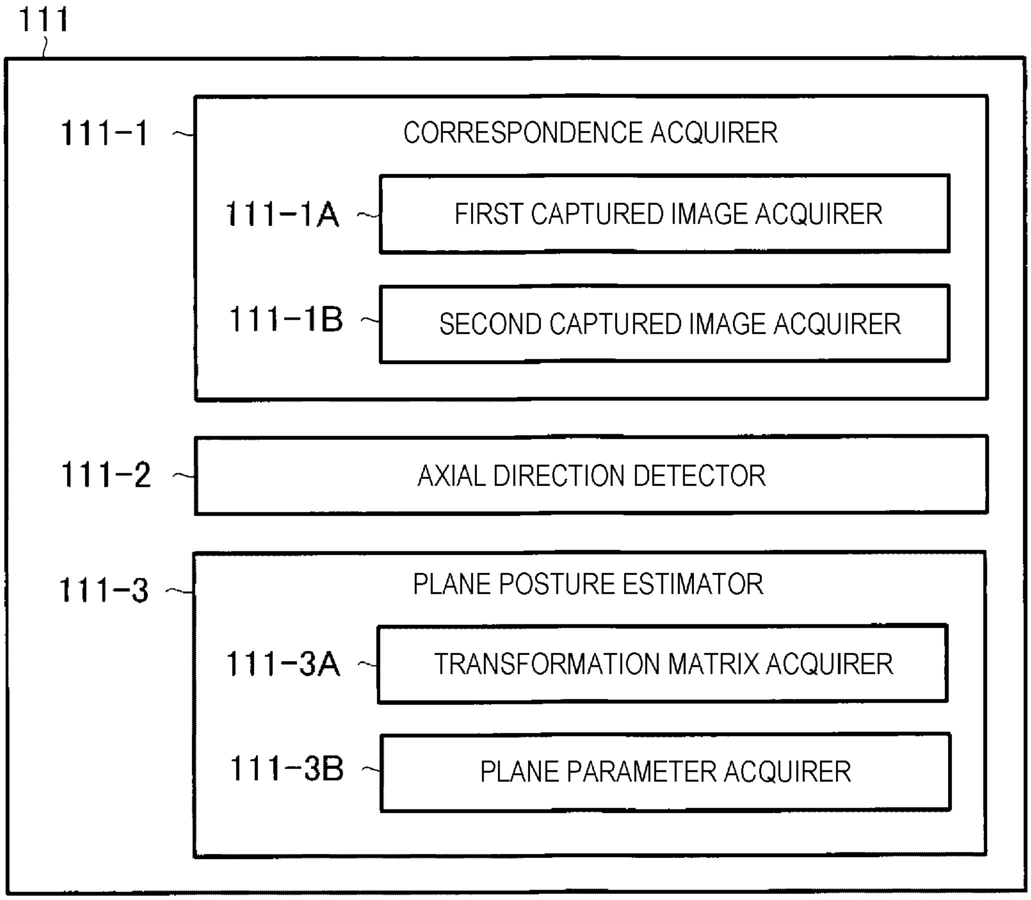
FIG. 5 is a functional block diagram showing functions of a three-dimensional shape calculator 111.

FIG. 5 is a functional block diagram showing functions of the three-dimensional shape calculator 111. The three-dimensional shape calculator 111 includes a correspondence acquirer 111-1, an axial direction detector 111-2, and a plane posture estimator 111-3. The correspondence acquirer 111-1 includes a first captured image acquirer 111-1A and a second captured image acquirer 111-1B. The plane posture estimator 111-3 further includes a transformation matrix acquirer 111-3A and a plane parameter acquirer 111-3B. The three-dimensional shape calculator 111 is an example of a "first calculator".

The correspondence acquirer 111-1 acquires a correspondence between a camera image coordinate system of the first imaging apparatus 30-1 and a panel image coordinate system of the first projector 20-1, and a correspondence between the camera image coordinate system of the first imaging apparatus 30-1 and a panel image coordinate system of the second projector 20-2. In the present description, the camera image coordinate system of the first imaging apparatus 30-1 is referred to as a "first camera image coordinate system". Similarly, a camera image coordinate system of the second imaging apparatus 30-2 is referred to as a "second camera image coordinate system". In the present description, the panel image coordinate system of the first projector 20-1 is referred to as a "first panel image coordinate system". Similarly, the panel image coordinate system of the second projector 20-2 is referred to as a "second panel image coordinate system". In other words, the correspondence acquirer 111-1 acquires the correspondence between the first camera image coordinate system and the first panel image coordinate system and the correspondence between the first camera image coordinate system and the second panel image coordinate system.

More specifically, the first projector 20-1 projects a pattern image onto the projection surface PF. The pattern image is an example of a "first projection image". Examples of the pattern image include a checkered pattern, a Gaussian dot pattern, and a circular pattern. The first imaging apparatus 30-1 captures an image of the pattern image projected onto the projection surface PF. The first captured image acquirer 111-1A provided in the correspondence acquirer 111-1 acquires the captured image of the pattern image captured by the first imaging apparatus 30-1. The correspondence acquirer 111-1 executes pattern detection on the captured image. For example, when the pattern image is a checkered pattern, the correspondence acquirer 111-1 acquires coordinate values of a grid on the checkered pattern. When the pattern image is a Gaussian dot pattern, the correspondence acquirer 111-1 acquires coordinate values of a location having a maximum luminance. When the pattern image is a circular pattern, the correspondence acquirer 111-1 acquires coordinate values of a center of the circle. The correspondence acquirer 111-1 acquires a correspondence between such coordinate values on the captured image and such coordinate values on the liquid crystal panel 260 provided in the first projector 20-1. That is, the correspondence acquirer 111-1 acquires a correspondence between such coordinate values in the first camera image coordinate system and such coordinate values in the first panel image coordinate system.

Similarly, the second projector 20-2 projects a pattern image onto the projection surface PF. The first captured image acquirer 111-1A provided in the correspondence acquirer 111-1 acquires a captured image of the pattern image captured by the first imaging apparatus 30-1. The correspondence acquirer 111-1 executes pattern detection on the captured image. The correspondence acquirer 111-1 acquires, based on the pattern detection, a correspondence between coordinate values in the first camera image coordinate system and coordinate values in the second panel image coordinate system.

The second captured image acquirer 111-1B provided in the correspondence acquirer 111-1 acquires a captured image of the pattern image captured by the second imaging apparatus 30-2. The correspondence acquirer 111-1 executes pattern detection on the captured image. The correspondence acquirer 111-1 acquires, based on the pattern detection, a correspondence between coordinate values in the second camera image coordinate system and coordinate values in the first panel image coordinate system and a correspondence between the coordinate values in the second camera image coordinate system and coordinate values in the second panel image coordinate system.

The correspondence acquirer 111-1 acquires, for each of the first imaging apparatus 30-1 and the second imaging apparatus 30-2, a correspondence between coordinate values in a camera image coordinate system and coordinate values in a panel image coordinate system of a projector, among all the projectors, whose display image DP displayed by the projector projecting a projection image PP onto the projection surface PF is within an imaging range.

The axial direction detector 111-2 detects, in the camera image coordinate system, a panel horizontal central axis direction that is a direction of an axis corresponding to a horizontal central axis in the panel image coordinate system.

Specifically, the axial direction detector 111-2 acquires where at least two points on a horizontal central axis, which is an axis in the vertical direction passing through an optical center, are located on the camera image coordinate system on the liquid crystal panel 260 provided in the first projector 20-1. The horizontal central axis passes through an intersection between an optical axis of the projection lens system 283 and the liquid crystal panel 260. The horizontal central axis is an example of the “first axis”. The liquid crystal panel 260 has two sides parallel to the horizontal central axis and two sides perpendicular to the horizontal central axis. The liquid crystal panel 260 has a side forming a right angle with the “first side” in addition to the “first side” orthogonal to the “first axis”. The side forming a right angle with the “first side” is an example of a “fourth side”. The liquid crystal panel 260 also has a side forming a right angle with the “fourth side”. The side forming a right angle with the “fourth side” is an example of a “fifth side”. Further, the liquid crystal panel 260 has a side forming a right angle with the “fifth side” and forming a right angle with the “first side”. The side forming a right angle with the “fifth side” and forming a right angle with the “first side” is an example of a “sixth side”. The “first axis” is an axis parallel to the “fourth side” and the “sixth side”. Further, in the projection image PP1 shown in FIG. 1, a second axis corresponding to the first axis may be an axis passing through a midpoint of a side ST and a midpoint of a side VU. A direction parallel to the second axis is an example of a “first direction”. The side ST is an example of a “seventh side”. A side TV is an example of an “eighth side”. The side VU is an example of a “ninth side”. A side US is an example of a “tenth side”. In other words, the projection image PP1 as the “first projection image” has the seventh side, the eighth side coupled to the seventh side, the ninth side coupled to the eighth side, and the tenth side coupled to the ninth side and the seventh side. The second axis is an axis passing through the midpoint of the seventh side and the midpoint of the ninth side of the projection image PP1 as the first projection image on the projection surface PF.

When the axial direction detector 111-2 acquires two points on the horizontal central axis that is an axis in the vertical direction passing through the optical center on the liquid crystal panel 260 provided in the first projector 20-1, the axial direction detector 111-2 sets a vector that is directed from up to down on the horizontal central axis coupling two corresponding points in the camera image coordinate system and has a length normalized to 1 as a panel horizontal central axis direction vector in the camera image coordinate system. On the other hand, when the axial direction detector 111-2 acquires three or more points on the horizontal central axis that is the axis in the vertical direction passing through the optical center on the liquid crystal panel 260 provided in the first projector 20-1, the axial direction detector 111-2 sets a vector that is directed from up to down on a straight line obtained by linear approximation using a method such as a least-squares method with respect to a point group of the three or more points and has a length normalized to 1 as the panel horizontal central axis direction vector in the camera image coordinate system.

The plane posture estimator 111-3 estimates a posture of the projection surface PF with respect to the first imaging apparatus 30-1. As described above, the plane posture estimator 111-3 includes the transformation matrix acquirer 111-3A and the plane parameter acquirer 111-3B.

The transformation matrix acquirer 111-3A converts coordinate values of corresponding points in the first camera image coordinate system used by the correspondence acquirer 111-1 into coordinate values in a first camera normalized coordinate system that is a normalized coordinate system of the first imaging apparatus 30-1. Here, the term “normalized coordinate system” refers to a coordinate system on an XY plane passing through a location having a length of 1 in a depth direction from an optical origin on an optical axis of the first imaging apparatus 30-1. In the normalized coordinate system, image distortion caused by a camera lens is eliminated. The normalized coordinate system has an optical center as an origin on the image captured by the first imaging apparatus 30-1. In addition, the transformation matrix acquirer 111-3A converts coordinate values of corresponding points in the second camera image coordinate system used by the correspondence acquirer 111-1 into coordinate values in a second camera normalized coordinate system that is a normalized coordinate system of the second imaging apparatus 30-2.

Further, the transformation matrix acquirer 111-3A calculates and acquires a projective transformation matrix from the first camera normalized coordinate system to the second camera normalized coordinate system by using the coordinate values of the first camera normalized coordinate system and the coordinate values of the second camera normalized coordinate system. When coordinates of a point in the first camera normalized coordinate system are ($x_1$, $y_1$) and coordinates of a point corresponding to the point in the second camera normalized coordinate system are ($x_2$, $y_2$), a projective transformation matrix H is expressed by the following Expression (1).

$$p\begin{pmatrix} x_1 \\ y_1 \\ 1 \end{pmatrix} = H\begin{pmatrix} x_2 \\ y_2 \\ 1 \end{pmatrix} = \begin{pmatrix} h_{00} & h_{01} & h_{02} \\ h_{10} & h_{11} & h_{12} \\ h_{20} & h_{21} & h_{22} \end{pmatrix}\begin{pmatrix} x_2 \\ y_2 \\ 1 \end{pmatrix} \qquad \text{Expression 1}$$

Here, p is always a constant of $p=h_{20}x_2+h_{21}y_2+h_{22}$ and is a numerical value different for coordinates of each corresponding point. In order to obtain the projective transformation matrix H, coordinate values of at least four sets of corresponding points are required. Among the coordinate values of the four or more sets of corresponding points, coordinate values of a corresponding point of each set are coordinate values when an image of the same point on a three-dimensional plane is captured by each of the first imaging apparatus 30-1 and the second imaging apparatus 30-2.

The plane parameter acquirer 111-3B acquires a plane parameter of the projection surface PF by using the projective transformation matrix H.

By performing singular value decomposition on the projective transformation matrix H, a position and a posture of the second imaging apparatus 30-2 at three-dimensional coordinates with respect to the first imaging apparatus 30-1 and the three-dimensional plane parameter of the projection surface PF with respect to the first imaging apparatus 30-1 are calculated. However, according to the singular value decomposition, two sets of solutions are derived each as a set of the position and the posture in three-dimensional coordinates of the second imaging apparatus 30-2 with respect to the first imaging apparatus 30-1 and the three-dimensional plane parameter of the projection surface PF with respect to the first imaging apparatus 30-1. Therefore, the plane parameter acquirer 111-3B selects a solution in which the position of the second imaging apparatus 30-2 with respect to the first imaging apparatus 30-1 indicated by each of the two solutions is closer to a position in the layout information indicating disposition of the first imaging apparatus 30-1 and the second imaging apparatus 30-2.

Here, the "layout information" indicates, for example, an up-down positional relationship or a left-right positional relationship between the first imaging apparatus 30-1 and the second imaging apparatus 30-2. As described above, since the first projector 20-1 and the second projector 20-2 are used for tiling, the first projector 20-1 and the second projector 20-2 are provided side by side in a left-right or up-down direction. Therefore, the plane parameter acquirer 111-3B can acquire a positional relationship between the first projector 20-1 and the second projector 20-2 by comparing projection center coordinates of the first projector 20-1 and the second projector 20-2 on the captured image. When the first imaging apparatus 30-1 is attached to the first projector 20-1 and the second imaging apparatus 30-2 is attached to the second projector 20-2, the plane parameter acquirer 111-3B can calculate the positional relationship between the first imaging apparatus 30-1 and the second imaging apparatus 30-2 based on the positional relationship between the first projector 20-1 and the second projector 20-2.

The layout information may be the layout information stored in the storage apparatus 12 of the information processing apparatus 10. The layout information basically indicates the positional relationship between the first imaging apparatus 30-1 and the second imaging apparatus 30-2. However, as described above, when the first imaging apparatus 30-1 is attached to the first projector 20-1 and the second imaging apparatus 30-2 is attached to the second projector 20-2, the layout information may be layout information indicating the disposition of the first projector 20-1 and the second projector 20-2. The layout information may also be information manually set by a user of the projection system 1.

Figure 6:
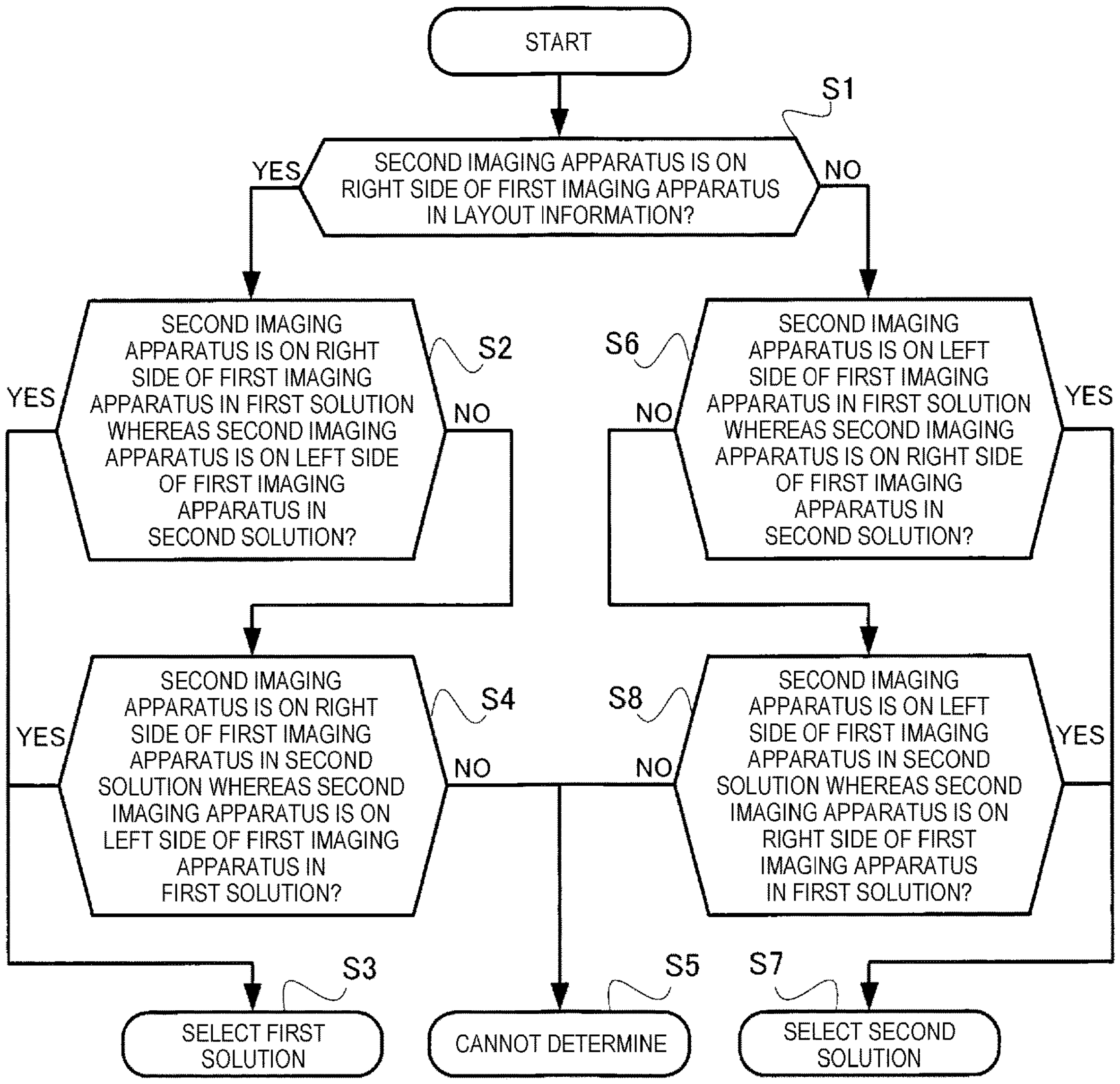
FIG. 6 is a flowchart showing a solution selection operation performed by a plane parameter acquirer 111-3B.

FIG. 6 is a flowchart showing a solution selection operation performed by the plane parameter acquirer 111-3B. A plane parameter of the projection surface PF with respect to the first imaging apparatus 30-1 in a first solution is (a, b, c)=($a_A$, $b_A$, $c_A$), and the plane parameter of the projection surface PF with respect to the first imaging apparatus 30-1 in a second solution is (a, b, c)=($a_B$, $b_B$, $c_B$).

In step S1, the processing apparatus 11 functions as the plane parameter acquirer 111-3B to determine whether the second imaging apparatus 30-2 is on the right side of the first imaging apparatus 30-1 when facing the projection surface PF in the layout information. When a determination result in step S1 is positive (step S1/YES), that is, when the second imaging apparatus 30-2 is located on the right side of the first imaging apparatus 30-1, the processing apparatus 11 executes processing of step S2. When the determination result in step S1 is negative, that is, when the second imaging apparatus 30-2 is located on the left side of the first imaging apparatus 30-1 (step S1/NO), the processing apparatus 11 executes processing of step S6.

In step S2, the processing apparatus 11 functions as the plane parameter acquirer 111-3B to determine whether the second imaging apparatus 30-2 is on the right side of the first imaging apparatus 30-1 when facing the projection surface PF in the first solution whereas the second imaging apparatus 30-2 is on the left side of the first imaging apparatus 30-1 when facing the projection surface PF in the second solution. When a determination result in step S2 is positive (step S2/YES), that is, when the second imaging apparatus 30-2 is on the right side of the first imaging apparatus 30-1 when facing the projection surface PF in the first solution whereas the second imaging apparatus 30-2 is on the left side of the first imaging apparatus 30-1 when facing the projection surface PF in the second solution, the processing apparatus 11 executes processing of step S3. On the other hand, when the determination result in step S2 is negative (step S2/NO), that is, when the second imaging apparatus 30-2 is on the left side of the first imaging apparatus 30-1 when facing the projection surface PF in the first solution, or when the second imaging apparatus 30-2 is on the right side of the first imaging apparatus 30-1 when facing the projection surface PF in the second solution, the processing apparatus 11 executes processing of step S4.

In step S3, the processing apparatus 11 functions as the plane parameter acquirer 111-3B to select the first solution. That is, the processing apparatus 11 selects (a, b, c)=($a_A$, $b_A$, $c_A$) as the plane parameter of the projection surface PF with respect to the first imaging apparatus 30-1.

In step S4, the processing apparatus 11 functions as the plane parameter acquirer 111-3B to determine whether the second imaging apparatus 30-2 is on the right side of the first imaging apparatus 30-1 when facing the projection surface PF in the second solution whereas the second imaging apparatus 30-2 is on the left side of the first imaging apparatus 30-1 when facing the projection surface PF in the first solution. When a determination result in step S4 is positive (step S4/YES), that is, when the second imaging apparatus 30-2 is on the right side of the first imaging apparatus 30-1 when facing the projection surface PF in the second solution whereas the second imaging apparatus 30-2 is on the left side of the first imaging apparatus 30-1 when facing the projection surface PF in the first solution, the processing apparatus 11 executes the processing of step S3. On the other hand, when the determination result in step S4 is negative (step S4/NO), that is, when the second imaging apparatus 30-2 is on the left side of the first imaging apparatus 30-1 when facing the projection surface PF in the second solution, or when the second imaging apparatus 30-2 is on the right side of the first imaging apparatus 30-1 when facing the projection surface PF in the first solution, the processing apparatus 11 executes processing of step S5.

In step S5, the processing apparatus 11 functions as the plane parameter acquirer 111-3B to determine that the positional relationship between the first imaging apparatus 30-1 and the second imaging apparatus 30-2 cannot be determined. In this case, the processing apparatus 11 may stop the operation.

In step S6, the processing apparatus 11 functions as the plane parameter acquirer 111-3B to determine whether the second imaging apparatus 30-2 is on the left side of the first imaging apparatus 30-1 when facing the projection surface PF in the first solution whereas the second imaging apparatus 30-2 is on the right side of the first imaging apparatus 30-1 when facing the projection surface PF in the second solution. When a determination result in step S6 is positive (step S6/YES), that is, when the second imaging apparatus 30-2 is on the left side of the first imaging apparatus 30-1 when facing the projection surface PF in the first solution whereas the second imaging apparatus 30-2 is on the right side of the first imaging apparatus 30-1 when facing the projection surface PF in the second solution, the processing apparatus 11 executes processing of step S7. On the other hand, when the determination result in step S6 is negative (step S6/NO), that is, when the second imaging apparatus 30-2 is on the right side of the first imaging apparatus 30-1 when facing the projection surface PF in the first solution, or when the second imaging apparatus 30-2 is on the left side of the first imaging apparatus 30-1 when facing the projection surface PF in the second solution, the processing apparatus 11 executes processing of step S8.

In step S7, the processing apparatus 11 functions as the plane parameter acquirer 111-3B to select the second solution. That is, the processing apparatus 11 selects (a, b, c)=($a_B$, $b_B$, $c_B$) as the plane parameter of the projection surface PF with respect to the first imaging apparatus 30-1.

In step S8, the processing apparatus 11 functions as the plane parameter acquirer 111-3B to determine whether the second imaging apparatus 30-2 is on the left side of the first imaging apparatus 30-1 when facing the projection surface PF in the second solution whereas the second imaging apparatus 30-2 is on the right side of the first imaging apparatus 30-1 when facing the projection surface PF in the first solution. When a determination result in step S8 is positive (step S8/YES), that is, when the second imaging apparatus 30-2 is on the left side of the first imaging apparatus 30-1 when facing the projection surface PF in the second solution whereas the second imaging apparatus 30-2 is on the right side of the first imaging apparatus 30-1 when facing the projection surface PF in the first solution, the processing apparatus 11 executes the processing of step S7. On the other hand, when the determination result in step S8 is negative (step S8/NO), that is, when the second imaging apparatus 30-2 is on the right side of the first imaging apparatus 30-1 when facing the projection surface PF in the second solution, or when the second imaging apparatus 30-2 is on the left side of the first imaging apparatus 30-1 when facing the projection surface PF in the first solution, the processing apparatus 11 executes the processing of step S5.

In FIG. 4, the on-surface converter 112 converts a two-dimensional panel horizontal central axis direction vector in the camera image coordinate system detected by the axial direction detector 111-2 into a three-dimensional panel horizontal central axis direction vector on the projection surface PF by using the plane parameter of the projection surface PF acquired by the plane posture estimator 111-3. Specifically, the on-surface converter 112 converts a two-dimensional panel horizontal central axis vector according to the first projector 20-1 on the first camera image coordinate system into a two-dimensional panel horizontal central axis direction vector according to the first projector 20-1 on the first camera normalized coordinate system by using an internal parameter of the first imaging apparatus 30-1. The conversion processing is the same as the conversion processing executed by the plane posture estimator 111-3. Further, the on-surface converter 112 converts the two-dimensional panel horizontal central axis direction vector according to the first projector 20-1 into a three-dimensional panel horizontal central axis direction vector according to the first projector 20-1 on the projection surface PF by using the plane parameter of the projection surface PF with respect to the first imaging apparatus 30-1. Specifically, when there is a plane satisfying ax+by +cz=1 in a three-dimensional coordinate system in which an optical center of the first imaging apparatus 30-1 serves as an origin, and coordinate values of a point obtained by observing a point (X, Y, Z) on the plane in the first camera normalized coordinate system are ($x_1$, $y_1$), the following Expression (2) is satisfied.

$$\begin{pmatrix} X \\ Y \\ Z \end{pmatrix} = \frac{1}{ax_1 + by_1 + c}\begin{pmatrix} x_1 \\ y_1 \\ 1 \end{pmatrix}$$ Expression 2

Therefore, the on-surface converter 112 can calculate three-dimensional coordinates (X, Y, Z) corresponding to coordinate values ($x_1$, $y_1$) in a two-dimensional camera normalized coordinate system based on the coordinate values ($x_1$, $y_1$) in the two-dimensional camera normalized coordinate system and the plane parameter (a, b, c).

By using the same method, the on-surface converter 112 converts a two-dimensional panel horizontal central axis direction vector according to the second projector 20-2 in the first camera image coordinate system into a three-dimensional panel horizontal central axis direction vector according to the second projector 20-2 on the projection surface PF.

Figure 7:
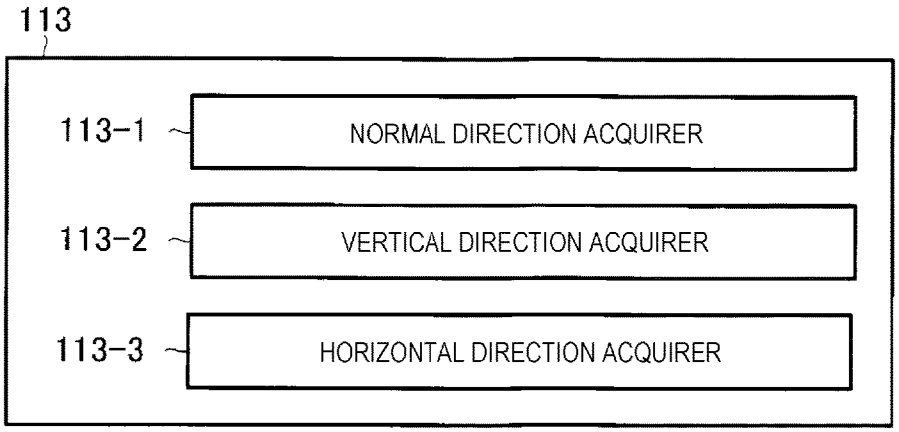
FIG. 7 is a functional block diagram showing functions of a direction acquirer 113.

The direction acquirer 113 calculates and acquires vectors in three directions orthogonal to one another on the projection surface PF. FIG. 7 is a functional block diagram showing functions of the direction acquirer 113. The direction acquirer 113 includes a normal direction acquirer 113-1, a vertical direction acquirer 113-2, and a horizontal direction acquirer 113-3. The normal direction acquirer 113-1 is an example of a "first acquirer". The vertical direction acquirer 113-2 is an example of a "second acquirer". The horizontal direction acquirer 113-3 is an example of a "third acquirer".

The normal direction acquirer 113-1 acquires a normal direction of the projection surface PF by using the plane parameter acquired by the plane parameter acquirer 111-3B. As described above, when the plane parameter of the projection surface PF is (a, b, c), a normal vector n ($n_x$, $n_y$, $n_z$) in the three-dimensional plane indicated by the expression of ax+by +cz=1 is calculated by the following Expression (3).

Expression 3

$$n(n_x, n_y, n_z) = \left(\frac{a}{\sqrt{a^2+b^2+c^2}}, \frac{b}{\sqrt{a^2+b^2+c^2}}, \frac{c}{\sqrt{a^2+b^2+c^2}}\right)$$

Figure 8:
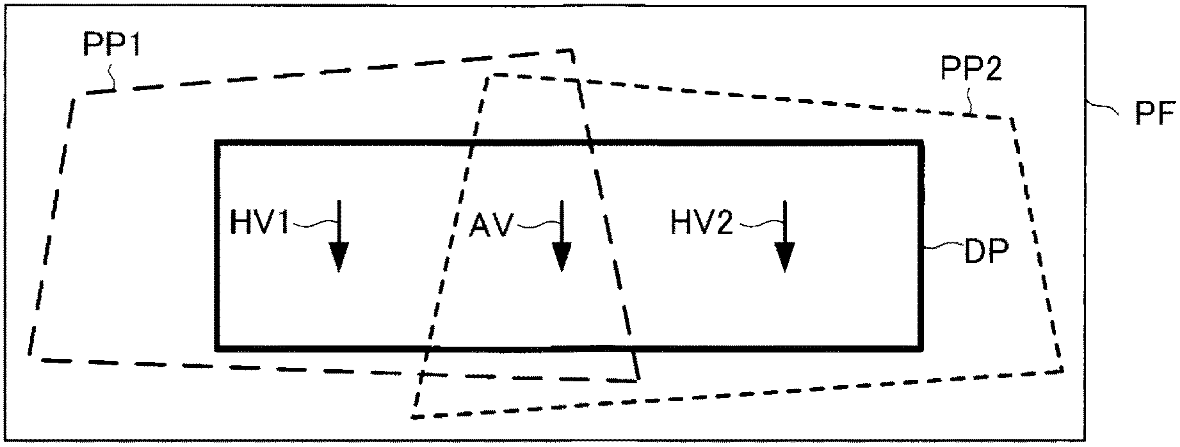
FIG. 8 shows an example of a panel horizontal central axis direction vector HV1, a panel horizontal central axis direction vector HV2, and a vector AV that is an average of the two vectors.

The vertical direction acquirer 113-2 calculates a vector that is an average of the three-dimensional panel horizontal central axis direction vector according to the first projector 20-1 on the projection surface PF and the three-dimensional panel horizontal central axis direction vector according to the second projector 20-2 on the projection surface PF output from the on-surface converter 112. FIG. 8 shows examples of a three-dimensional panel horizontal central axis direction vector HV1 according to the first projector 20-1 on the projection surface PF, a three-dimensional panel horizontal central axis direction vector HV2 according to the second projector 20-2 on the projection surface PF, and a vector AV that is an average of the two vectors.

Specifically, the vertical direction acquirer 113-2 calculates an average element of an element of the three-dimensional panel horizontal central axis direction vector HV1 according to the first projector 20-1 on the projection surface PF and an element of the three-dimensional panel horizontal central axis direction vector HV2 according to the second projector 20-2 on the projection surface PF. The vector AV having the average element of the elements of both panel horizontal central axis direction vectors HV is a vector in the vertical direction within the projection surface PF. The vector in the vertical direction within the projection surface PF is referred to as a "vertical vector" in the present description. In the present description, the vertical vector is expressed by an expression of v ($v_x$, $v_y$, $v_z$). The vertical direction acquirer 113-2 acquires the vertical direction within the projection surface PF based on the vertical vector v.

Here, a direction indicated by the three-dimensional panel horizontal central axis direction vector HV1 according to the first projector 20-1 on the projection surface PF is an example of the "first direction". A direction indicated by the three-dimensional panel horizontal central axis direction vector HV2 according to the second projector 20-2 on the projection surface PF is an example of a "third direction". The vector AV, which is an average of the three-dimensional panel horizontal central axis direction vector HV1 according to the first projector 20-1 on the projection surface PF and the three-dimensional panel horizontal central axis direction vector HV2 according to the second projector 20-2 on the projection surface PF, is an example of a "fourth direction". The fourth direction is an intermediate direction between the first direction and the third direction.

As described above, the first projector 20-1 and the second projector 20-2 are provided substantially horizontally, and roll rotation components of the two projectors 20 are not 0. The vertical direction acquirer 113-2 compensates for roll rotation as much as possible by averaging the roll rotation components. When the projection system 1 executes tiling by using three or more projectors 20 instead of two projectors 20, variations in the roll rotation are further averaged, and the roll rotation is further compensated.

The horizontal direction acquirer 113-3 acquires the horizontal direction orthogonal to the normal direction and the vertical direction on the projection surface PF. Specifically, the horizontal direction acquirer 113-3 calculates an outer product of the normal vector n ($n_x$, $n_y$, $n_z$) calculated by the normal direction acquirer 113-1 and the vertical vector v ($v_x$, $v_y$, $v_z$) calculated by the vertical direction acquirer 113-2, and sets a vector obtained by normalizing the calculated vector as a horizontal vector h ($h_x$, $h_y$, $h_z$). A direction indicated by the horizontal vector h is an example of the "second direction".

Figure 9:
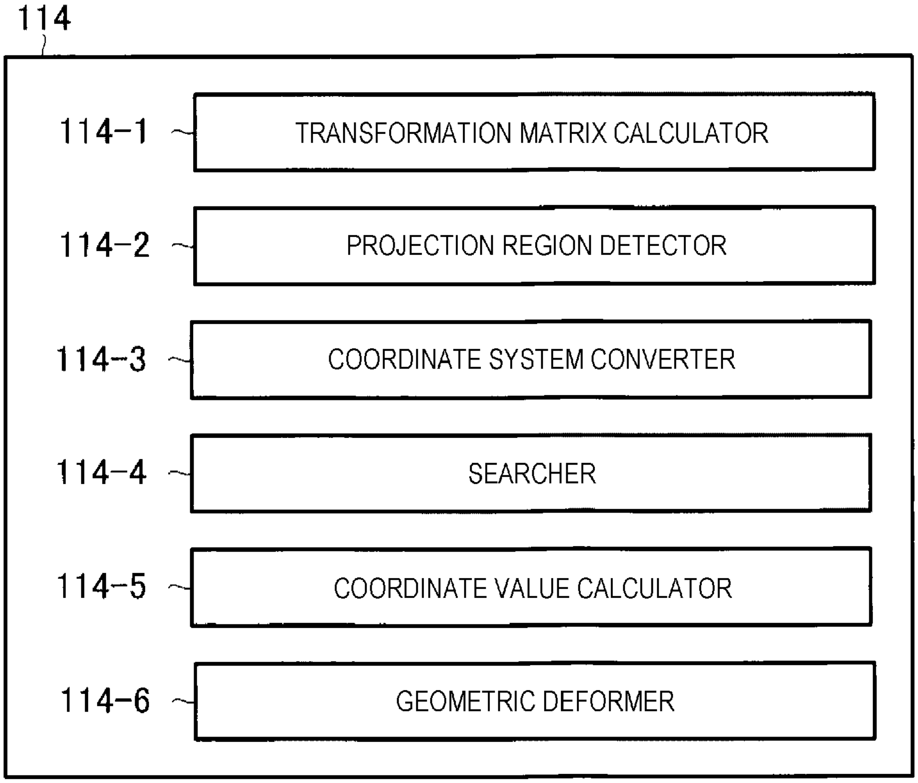
FIG. 9 is a functional block diagram showing functions of an adjuster 114.

In FIG. 4, the adjuster 114 adjusts shapes of the projection images PP1 and PP2 including a part of the display image DP such that the rectangular display image DP having one side orthogonal to the vertical direction and another side orthogonal to the horizontal direction is displayed on the projection surface PF. Here, the display image DP is an example of a "first display image". The display image DP as the first display image has a side orthogonal to the first direction. The side orthogonal to the first direction is an example of a "second side". The display image DP also has a side orthogonal to the second direction. Here, the "second direction" is a direction orthogonal to the normal direction of the projection surface PF and the "first direction". The side orthogonal to the second direction is an example of a "third side". The projection images PP1 and PP2 are each an example of a "second projection image". FIG. 9 is a functional block diagram showing functions of the adjuster 114. The adjuster 114 includes a trans formation matrix calculator 114-1, a projection region detector 114-2, a coordinate system converter 114-3, a searcher 114-4, a coordinate value calculator 114-5, and a geometric deformer 114-6.

The transformation matrix calculator 114-1 calculates a transformation matrix from a first camera coordinate system, which is a three-dimensional coordinate system viewed from the first imaging apparatus 30-1, to a three-dimensional coordinate system when the projection surface PF is viewed from the front. Specifically, the transformation matrix calculator 114-1 defines a 3×3 transformation matrix R having three vectors, that is, the normal vector n ($n_x$, $n_y$, $n_z$), the vertical vector v ($v_x$, $v_y$, $v_z$), and the horizontal vector h ($h_x$, $h_y$, $h_z$) as row vectors according to the following Expression (4).

Expression 4

$$R = \begin{pmatrix} h_x & h_y & h_z \\ v_x & v_y & v_z \\ n_x & n_y & n_z \end{pmatrix}$$

The coordinate system converter 114-3, which will be described later, can convert, by using the transformation matrix R, three-dimensional coordinate values of a point represented in the three-dimensional coordinate system viewed from the first imaging apparatus 30-1 into three-dimensional coordinate values in a projection surface coordinate system that is the three-dimensional coordinate system when the projection surface PF is viewed from the front.

The projection region detector 114-2 detects a projection region of each projector 20 on the image captured by the first imaging apparatus 30-1. Specifically, the projection region detector 114-2 extracts coordinate values of four grid points closest to coordinates corresponding to four corners of the liquid crystal panel 260 provided in each projector 20 from coordinate values of a corresponding point group on the image captured by the first imaging apparatus 30-1, which are acquired by the correspondence acquirer 111-1. A region surrounded by the four grid points substantially matches the projection region. The projection region detector 114-2 may calculate a projective transformation matrix between the first camera image coordinate system and the panel image coordinate system in each projector 20 in advance, and acquire the coordinate values of points at four corners without margin by projecting the coordinate values of the points of the four corners of the liquid crystal panel 260 onto the first camera image coordinate system.

The coordinate system converter 114-3 converts coordinate values of the projection region in the first camera image coordinate system into coordinate values in the projection surface coordinate system. Specifically, the coordinate system converter 114-3 converts the coordinate values of the points at the four corners of the projection region in the first camera image coordinate system into coordinate values of the points at the four corners of the projection region in the first camera normalized coordinate system by using the internal parameter of the first imaging apparatus 30-1. The conversion processing is the same as the conversion processing executed by the plane posture estimator 111-3. Further, the coordinate system converter 114-3 converts the coordinate values of the points at the four corners of the projection region in the first camera normalized coordinate system into the coordinate values of the points at the four corners of the projection region in the first camera coordinate system by using the plane parameter (a, b, c). The conversion processing is the same as the conversion processing executed by the on-surface converter 112. Further, the coordinate system converter 114-3 converts the coordinate values of the points at the four corners of the projection region in the first camera coordinate system into the coordinate values of the points at the four corners of the projection region in the projection surface coordinate system by using the transformation matrix R. Specifically, when the coordinate values of the points at the four corners of the projection region in the first camera coordinate system are ($X_1$, $Y_1$, $Z_1$), the coordinate system converter 114-3 calculates coordinate values ($X_S$, $Y_S$, $Z_S$) of the points at the four corners of the projection region in the three-dimensional projection surface coordinate system by the following Expression (5).

$$\begin{pmatrix} X_S \\ Y_S \\ Z_S \end{pmatrix} = R \begin{pmatrix} X_1 \\ Y_1 \\ Z_1 \end{pmatrix} \quad \text{Expression 5}$$

Finally, the coordinate system converter 114-3 extracts only ($X_S$, $Y_S$), which are X and Y components, among ($X_S$, $Y_S$, $Z_S$) to calculate the coordinate values of the points at the four corners of the projection region in a two-dimensional projection surface coordinate system. The two-dimensional projection surface coordinate system is a coordinate system within the projection surface PF.

Figure 10:
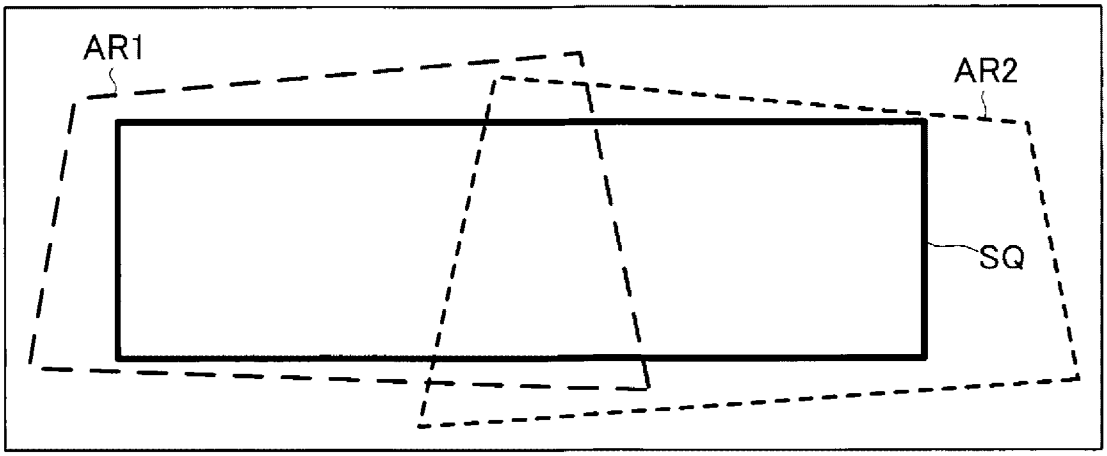
FIG. 10 shows examples of a projection region AR1 of the first projector 20-1, a projection region AR2 of a second projector 20-2, and a rectangle SQ having a maximum area.

The searcher 114-4 searches for a rectangle having a maximum area inscribed in an entire region that is a sum of the projection region of the first projector 20-1 and the projection region of the second projector 20-2. FIG. 10 shows examples of a projection region AR1 of the first projector 20-1, a projection region AR2 of the second projector 20-2, and a rectangle SQ having a maximum area. The searcher 114-4 may draw a plurality of rectangles SQ in the entire region and select the rectangle SQ having the maximum area among the plurality of rectangles SQ. Alternatively, the searcher 114-4 may determine the rectangle SQ having the maximum area by using dynamic programming. An aspect ratio of the rectangle SQ searched for at this time may be set by the user in advance. Alternatively, if there is no particular designation, the searcher 114-4 may determine the rectangle SQ having the maximum area in the entire region regardless of the aspect ratio. The searcher 114-4 stores, in the two-dimensional projection surface coordinate system, coordinates of four corners of the rectangle SQ determined by the above method as a corrected coupling region in the projection surface coordinate system.

Figure 11:
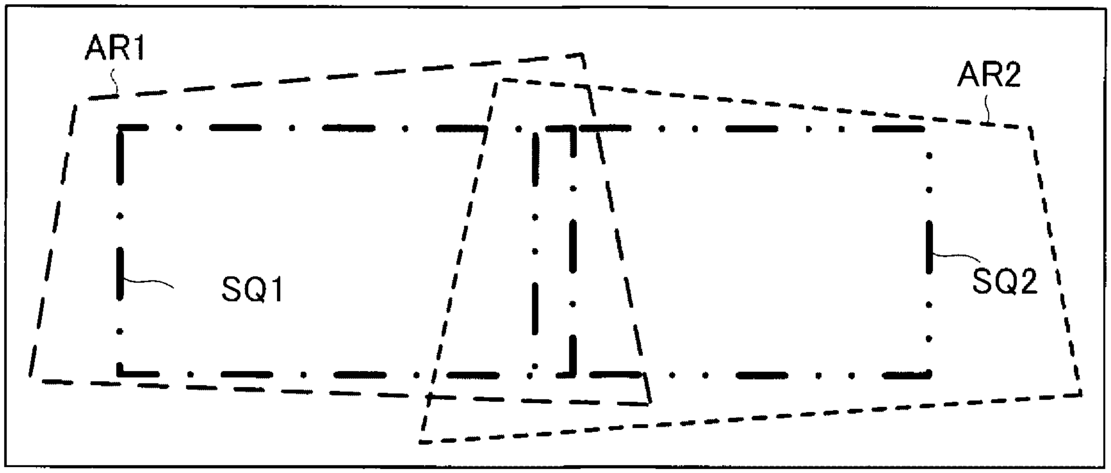
FIG. 11 is a diagram illustrating an operation of a coordinate value calculator 114-5.
Figure 12:
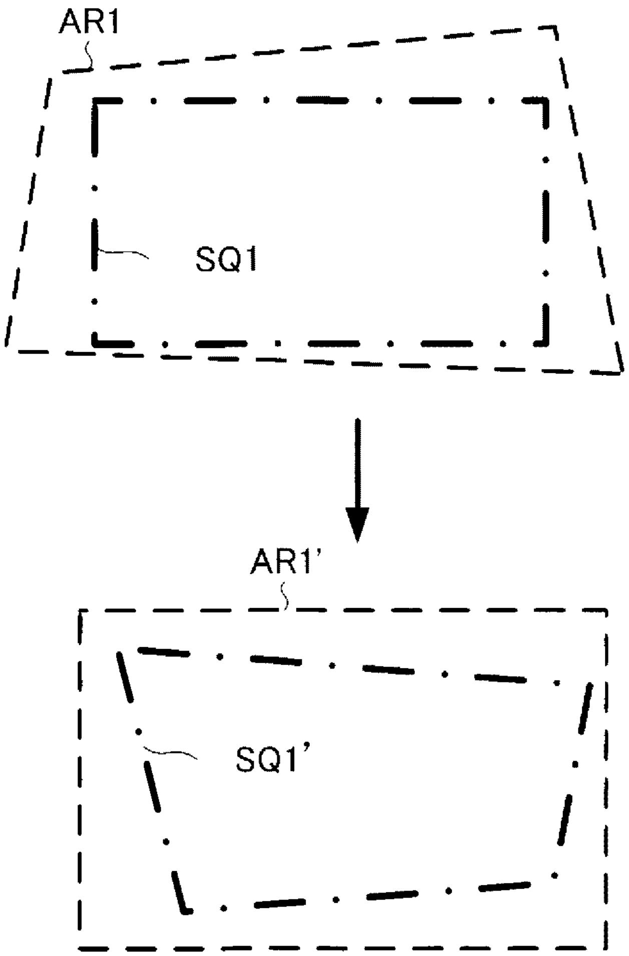
FIG. 12 is a diagram illustrating the operation of the coordinate value calculator 114-5.
Figure 13:
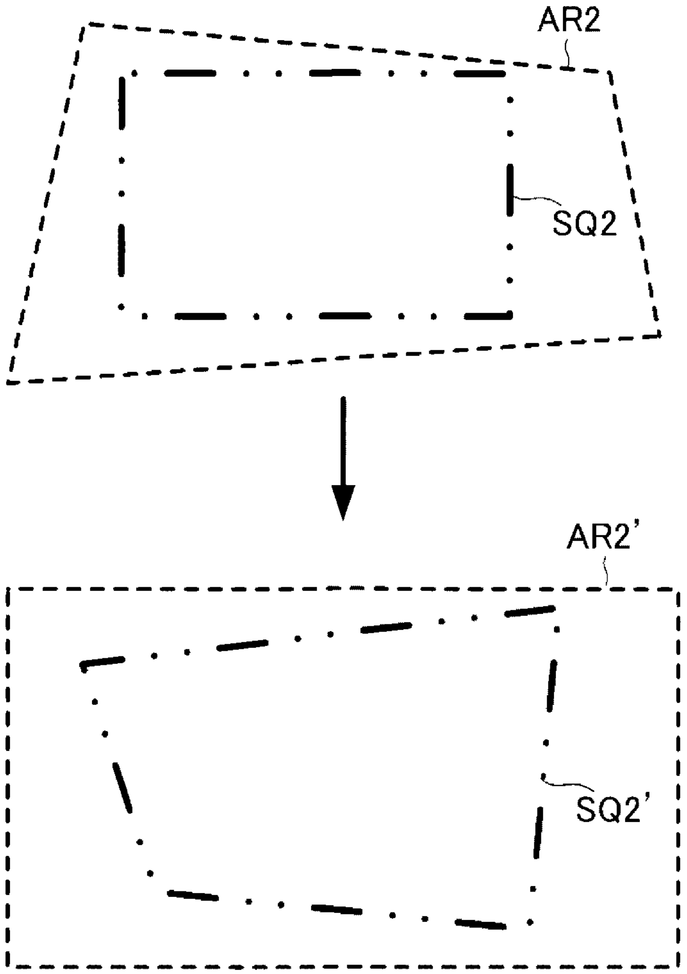
FIG. 13 is a diagram illustrating the operation of the coordinate value calculator 114-5.

The coordinate value calculator 114-5 calculates coordinate values of four corners of the corrected coupling region in the first panel image coordinate system of the first projector 20-1 and the second panel image coordinate system of the second projector 20-2 by using coordinate values of the four corners of the corrected coupling region stored by the searcher 114-4. FIGS. 11 to 13 are diagrams illustrating an operation of the coordinate value calculator 114-5.

First, as shown in FIG. 11, the coordinate value calculator 114-5 divides the rectangle SQ as the corrected coupling region shown in FIG. 10 into two rectangles SQ1 and SQ2 matching aspect ratios of the liquid crystal panels 260 of the first projector 20-1 and the second projector 20-2, respectively. At this time, the coordinate value calculator 114-5 makes a left side of the rectangle SQ1 coincide with a left side of the rectangle SQ and makes a right side of the rectangle SQ2 coincide with a right side of the rectangle SQ. The coordinate value calculator 114-5 sets coordinates of four corners of each of the rectangle SQ1 and the rectangle SQ2 as corrected four-corner coordinates in the projection surface coordinate system.

Next, the coordinate value calculator 114-5 acquires coordinate values of four-corner coordinates of the projection region AR1 before correction in the first panel image coordinate system and coordinate values of four-corner coordinates of a projection region AR1' after correction in the projection surface coordinate system. At this time, the coordinate values of the four-corner coordinates of the projection region AR1 before correction in the first panel image coordinate system can be obtained from panel resolution of the first projector 20-1.

Next, the coordinate value calculator 114-5 calculates a projective transformation matrix $H_1$ based on a correspondence between the coordinate values of the four-corner coordinates of the projection region AR1 before correction in the first panel image coordinate system and the coordinate values of the four-corner coordinates of the projection region AR1' after correction in the projection surface coordinate system. The projective transformation matrix $H_1$ is a projective transformation matrix from the projection surface coordinate system to the first panel image coordinate system.

Finally, as shown in FIG. 12, the coordinate value calculator 114-5 can calculate corrected four-corner coordinates of a rectangle SQ1', which is a final output, by projecting the corrected four-corner coordinates of the rectangle SQ1 in the projection surface coordinate system onto the first panel image coordinate system by using the projective transformation matrix $H_1$.

Similarly, the coordinate value calculator 114-5 acquires coordinate values of four-corner coordinates of the projection region AR2 before correction in the second panel image coordinate system and coordinate values of four-corner coordinates of a projection region AR2' after correction in the projection surface coordinate system. At this time, the coordinate values of the four-corner coordinates of the projection region AR2 before correction in the second panel image coordinate system can be obtained from panel resolution of the second projector 20-2.

Next, the coordinate value calculator 114-5 calculates a projective transformation matrix $H_2$ based on a correspondence between the coordinate values of the four-corner coordinates of the projection region AR2 before correction in the second panel image coordinate system and the coordinate values of the four-corner coordinates of the projection region AR2' after correction in the projection surface coordinate system. The projective transformation matrix $H_2$ is a projective transformation matrix from the projection surface coordinate system to the second panel image coordinate system.

Finally, as shown in FIG. 13, the coordinate value calculator 114-5 can calculate corrected four-corner coordinates of a rectangle SQ2', which is a final output, by projecting the corrected four-corner coordinates of the rectangle SQ2 in the projection surface coordinate system onto the second panel image coordinate system by using the projective transformation matrix $H_2$.

In FIG. 9, the geometric deformer 114-6 geometrically deforms the projection image by using the corrected four-corner coordinates of the rectangle SQ1' and the corrected four-corner coordinates of the rectangle SQ2', which are calculated by the coordinate value calculator 114-5.

In FIG. 4, the projection controller 115 causes each of the first projector 20-1 and the second projector 20-2 to project the pattern image toward the projection surface PF. Here, the pattern image projected from the first projector 20-1 is an example of the "first projection image". The pattern image projected from the second projector 20-2 is an example of a "third projection image". The projection controller 115 projects the projection image adjusted by the adjuster 114 from each of the first projector 20-1 and the second projector 20-2 toward the projection surface PF. Here, the projection image projected from the first projector 20-1 is an example of a "fourth projection image". The projection image projected from the second projector 20-2 is an example of a "fifth projection image". Specifically, the projection controller 115 projects the projection image corrected to a shape of the rectangle SQ1' shown in FIG. 12 from the first projector 20-1 toward the projection surface PF. Similarly, the projection controller 115 projects the projection image corrected to a shape of the rectangle SQ2' shown in FIG. 13 from the second projector 20-2 toward the projection surface PF. As a result, the rectangle SQ shown in FIG. 10 is displayed on the projection surface PF. The rectangle SQ is an example of a "second display image". The second display image has a side orthogonal to the fourth direction. The side orthogonal to the fourth direction is an example of the "second side". The second display image also has a side orthogonal to the second direction. The side orthogonal to the second direction is an example of the "third side". The fourth projection image includes a portion of the second display image. The fifth projection image includes a remaining portion of the second display image.

1-4: Operation of Embodiment

Figure 14:
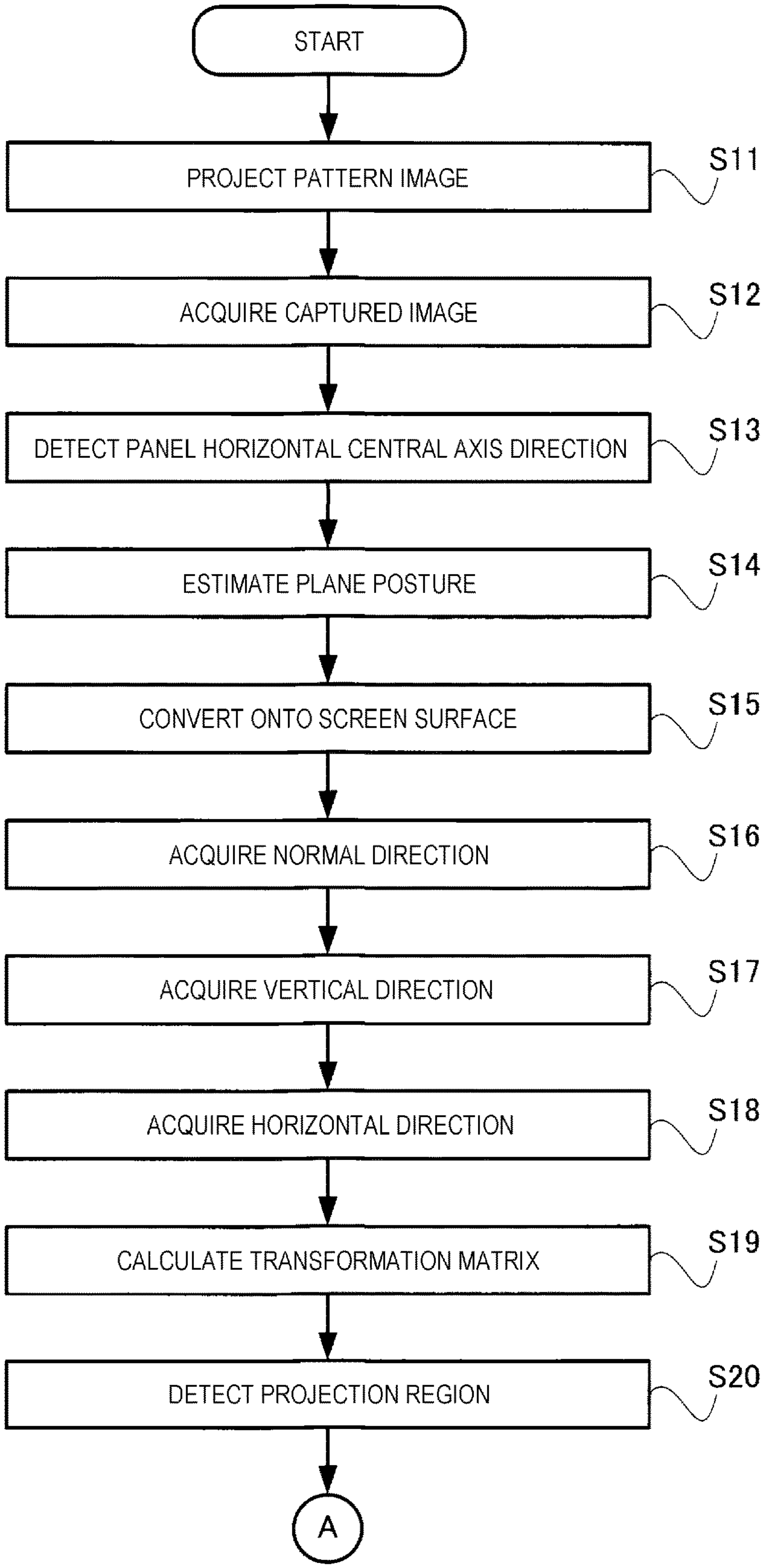
FIG. 14 is a flowchart showing an operation of the information processing apparatus 10.
Figure 15:
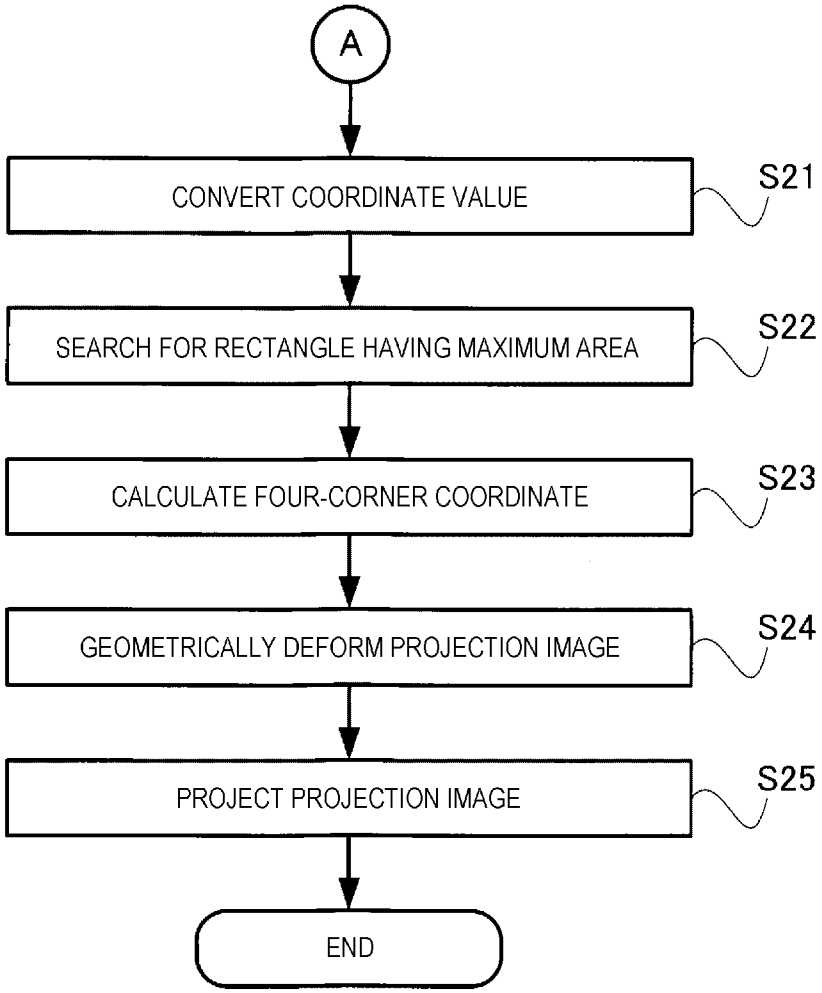
FIG. 15 is a flowchart showing the operation of the information processing apparatus 10.

FIGS. 14 and 15 are flowcharts showing an operation of the information processing apparatus 10 according to the first embodiment. Hereinafter, the operation of the information processing apparatus 10 will be described with reference to FIGS. 14 and 15.

In step S11, the processing apparatus 11 functions as the projection controller 115. The processing apparatus 11 causes the first projector 20-1 to project the pattern image onto the projection surface PF. Similarly, the processing apparatus 11 causes the second projector 20-2 to project the pattern image onto the projection surface PF.

In step S12, the processing apparatus 11 functions as the first captured image acquirer 111-1A and the second captured image acquirer 111-1B. The processing apparatus 11 acquires a captured image of the pattern image captured by the first imaging apparatus 30-1. The processing apparatus 11 also acquires a captured image of the pattern image captured by the second imaging apparatus 30-2. Further, the processing apparatus 11 functions as the correspondence acquirer 111-1. The processing apparatus 11 acquires the correspondence between the first camera image coordinate system and the first panel image coordinate system, the correspondence between the first camera image coordinate system and the second panel image coordinate system, the correspondence between the second camera image coordinate system and the first panel image coordinate system, and the correspondence between the second camera image coordinate system and the second panel image coordinate system.

In step S13, the processing apparatus 11 functions as the axial direction detector 111-2. The processing apparatus 11 detects, in the camera image coordinate system, the panel horizontal central axis direction that is the direction of the axis corresponding to the horizontal central axis in the panel image coordinate system.

In step S14, the processing apparatus 11 functions as the plane posture estimator 111-3. The processing apparatus 11 estimates the posture of the projection surface PF with respect to the first imaging apparatus 30-1.

In step S15, the processing apparatus 11 functions as the on-surface converter 112. The processing apparatus 11 converts the two-dimensional panel horizontal central axis direction vector in the camera image coordinate system into the three-dimensional panel horizontal central axis direction vector on the projection surface PF by using the plane parameter of the projection surface PF.

In step S16, the processing apparatus 11 functions as the normal direction acquirer 113-1. The processing apparatus 11 acquires the normal direction of the projection surface PF.

In step S17, the processing apparatus 11 functions as the vertical direction acquirer 113-2. The processing apparatus 11 acquires the vertical direction of the projection surface PF.

In step S18, the processing apparatus 11 functions as the horizontal direction acquirer 113-3. The processing apparatus 11 acquires the horizontal direction of the projection surface PF.

In step S19, the processing apparatus 11 functions as the transformation matrix calculator 114-1. The processing apparatus 11 calculates the transformation matrix from the first camera coordinate system, which is the three-dimensional coordinate system viewed from the first imaging apparatus 30-1, to the three-dimensional coordinate system when the projection surface PF is viewed from the front.

In step S20, the processing apparatus 11 functions as the projection region detector 114-2. The processing apparatus 11 detects the projection region of each projector 20 on the image captured by the first imaging apparatus 30-1.

In step S21, the processing apparatus 11 functions as the coordinate system converter 114-3. The processing apparatus 11 converts the coordinate values of the projection region in the first camera image coordinate system into the coordinate values in the projection surface coordinate system.

In step S22, the processing apparatus 11 functions as the searcher 114-4. The processing apparatus 11 searches for the rectangle SQ having the maximum area inscribed in the entire area that is the sum of the projection region AR1 of the first projector 20-1 and the projection region AR2 of the second projector 20-2.

In step S23, the processing apparatus 11 functions as the coordinate value calculator 114-5. The processing apparatus 11 calculates the coordinate values of the four corners of each of the rectangle SQ1' in the first panel image coordinate system of the first projector 20-1 and the rectangle SQ2' in the second panel image coordinate system of the second projector 20-2 by using the coordinate values of the four corners of the corrected coupling region stored by the searcher 114-4.

In step S24, the processing apparatus 11 functions as the geometric deformer 114-6. The processing apparatus 11 geometrically deforms the projection image by using the corrected four-corner coordinates of the rectangle SQ1' and the corrected four-corner coordinates of the rectangle SQ2'.

In step S25, the processing apparatus 11 functions as the projection controller 115. The processing apparatus 11 projects the adjusted projection image from each of the first projector 20-1 and the second projector 20-2 toward the projection surface PF.

2: Modifications

The present disclosure is not limited to the embodiment described above. Specific modifications will be described below.

2-1: Modification 1

In the embodiment described above, the projection system. 1 includes two projectors, that is, the first projector 20-1 and the second projector 20-2. However, the projection system 1 may include any number of projectors.

When the projection system 1 includes only one first projector 20-1, the first direction indicated by the three-dimensional panel horizontal central axis direction vector HV1 according to the first projector 20-1 on the projection surface PF is the vertical direction.

2-2: Modification 2

In the embodiment described above, the information processing apparatus 10, the first projector 20-1, and the first imaging apparatus 30-1 are separate from one another. However, two or more thereof may be implemented as a single apparatus accommodated in the same housing. The same applies to the information processing apparatus 10, the second projector 20-2, and the second imaging apparatus 30-2.

2-3: Modification 3

In the embodiment described above, the projection system 1 may use a stereo camera including two imaging apparatuses instead of the first imaging apparatus 30-1 and the second imaging apparatus 30-2. Alternatively, the projection system 1 may use a TOF camera that can perform three-dimensional measurement alone instead of the first imaging apparatus 30-1 and the second imaging apparatus 30-2.

2-4: Modification 4

In the embodiment described above, the information processing apparatus 10 may be a PC, a smartphone, or a tablet. Alternatively, the functions of the information processing apparatus 10 may be distributed as an application to an external apparatus (not shown in FIG. 1) via the communication network NET.

3: Summary of Disclosure

Hereinafter, a summary of the present disclosure will be added.

(Appendix 1) A projection image adjustment method including: acquiring measurement data obtained by measuring a three-dimensional shape of a projection surface onto which a first projection image is projected from a first projector including a rectangular first display panel having a first side orthogonal to a first axis; calculating, based on the acquired measurement data, a parameter related to the three-dimensional shape; acquiring, based on the parameter, a normal direction of the projection surface; acquiring, based on the parameter, a first direction corresponding to the first axis and parallel to a second axis in the first projection image; acquiring a second direction orthogonal to the normal direction and the first direction; adjusting, on the projection surface, a shape of a second projection image including a portion of a rectangular first display image having a second side orthogonal to the first direction and a third side orthogonal to the second direction; and projecting the second projection image from the first projector onto the projection surface.

According to the display image adjustment method, the first direction parallel to the second axis in the first projection image and the second direction orthogonal to the normal direction of the projection surface and the first direction are acquired, and the shape of the projection image is adjusted based on the acquired first direction and the acquired second direction. Accordingly, when the projection image is projected onto the projection surface, rotation of the projection image within the projection surface as viewed from the projector can be prevented.

(Appendix 2) The projection image adjustment method according to Appendix 1, in which the second projection image is projected onto the projection surface via a lens, the first display panel has a fourth side forming a right angle with the first side, a fifth side forming a right angle with the fourth side, and a sixth side forming a right angle with the fifth side and forming a right angle with the first side, and the first axis is an axis that passes an intersection between an optical axis of the lens and the first display panel and is parallel to the fourth side and the sixth side.

According to the projection image adjustment method, the direction, which passes through the intersection between the optical axis of the lens and the first display panel and is parallel to the mutually facing sides, is acquired, and thus the first axis can be accurately defined in consideration of an influence of rotation.

(Appendix 3) The projection image adjustment method according to Appendix 1 or 2, in which the first projection image has a seventh side, an eighth side coupled to the seventh side, a ninth side coupled to the eighth side, and a tenth side coupled to the ninth side and the seventh side, and the second axis is an axis passing a midpoint of the seventh side and a midpoint of the ninth side of the first projection image on the projection surface.

According to the projection image adjustment method, by acquiring the direction coupling the midpoints of the mutually facing sides of the first projection image, it is possible to accurately define, in consideration of the influence of rotation, the second axis corresponding to the first axis in the first projection image projected onto the projection surface.

(Appendix 4) The projection image adjustment method according to any one of Appendix 1 to Appendix 3, further including: projecting a third projection image onto the projection surface from a second projector including a rectangular second display panel having an eleventh side orthogonal to a third axis; acquiring, based on the parameter, a third direction toward one end of a fourth axis corresponding to the third axis in the third projection image; and calculating a fourth direction that is an intermediate direction between the first direction and the third direction, in which, when an image is projected onto the projection surface by the first projector and the second projector, the second direction is orthogonal to the normal direction and the fourth direction.

According to the projection image adjustment method, the fourth direction can be appropriately acquired by acquiring the intermediate direction between the directions in the projection image projected by the plurality of projectors.

(Appendix 5) The projection image adjustment method according to Appendix 4, further including: adjusting, on the projection surface, a shape of a fourth projection image including a portion of a rectangular second display image having a second side orthogonal to the fourth direction and a third side orthogonal to the second direction, and a shape of a fifth projection image including a remaining portion of the second display image; and, when an image is projected onto the projection surface by the first projector and the second projector, projecting the fourth projection image from the first projector and projecting the fifth projection image from the second projector.

According to the projection image adjustment method, the rectangular second display image having the second side orthogonal to the fourth direction and the third side orthogonal to the second direction is displayed. Accordingly, even when projection is performed by a plurality of projectors, the projection image can be prevented from being displayed in a rotated manner.

(Appendix 6) A projection system including: a first projector including a rectangular first display panel having a first side orthogonal to a first axis; a sensor configured to measure a three-dimensional shape of a projection surface onto which the first projector projects a first projection image; and an information processing apparatus configured to calculate, based on measurement data acquired from the sensor, a parameter related to the three-dimensional shape, acquire, based on the parameter, a normal direction of the projection surface, acquire, based on the parameter, a first direction corresponding to the first axis and parallel to a second axis in the first projection image, acquire a second direction orthogonal to the normal direction and the first direction, adjust, on the projection surface, a shape of a second projection image including a portion of a rectangular first display image having a second side orthogonal to the first direction and a third side orthogonal to the second direction, and project the second projection image from the first projector onto the projection surface.

According to the projection system, the first direction parallel to the second axis in the first projection image and the second direction orthogonal to the normal direction of the projection surface and the first direction are acquired, and the shape of the projection image is adjusted based on the acquired first direction and the acquired second direction. Accordingly, when the projection image is projected onto the projection surface, rotation of the projection image within the projection surface as viewed from the projector can be prevented.

(Appendix 7) A non-transitory computer-readable storage medium storing an information processing program, the information processing program including: causing a computer to calculate, based on measurement data acquired from a sensor that measures a three-dimensional shape of a projection surface onto which a first projection image is projected by a first projector including a rectangular first display panel having a first side orthogonal to a first axis, a parameter related to the three-dimensional shape, acquire, based on the parameter, a normal direction of the projection surface, acquire, based on the parameter, a first direction corresponding to the first axis and parallel to a second axis in the first projection image, acquire a second direction orthogonal to the normal direction and the first direction, adjust, on the projection surface, a shape of a second projection image including a portion of a rectangular first display image having a second side orthogonal to the first direction and a third side orthogonal to the second direction, and project the second projection image from the first projector onto the projection surface.

According to the non-transitory computer-readable storage medium storing the information processing program, the first direction parallel to the second axis in the first projection image and the second direction orthogonal to the normal direction of the projection surface and the first direction are acquired, and the shape of the projection image is adjusted based on the acquired first direction and the acquired second direction. Accordingly, when the projection image is projected onto the projection surface, rotation of the projection image within the projection surface as viewed from the projector can be prevented.

What is claimed is:

1. A projection image adjustment method comprising:

acquiring measurement data obtained by measuring a three-dimensional shape of a projection surface onto which a first projection image is projected from a first projector including a rectangular first display panel having a first side orthogonal to a first axis;

calculating, based on the acquired measurement data, a parameter related to the three-dimensional shape;

calculating, based on the parameter, a normal direction of the projection surface;

calculating, based on the parameter, a first direction corresponding to the first axis and parallel to a second axis in the first projection image;

calculating a second direction orthogonal to the normal direction and the first direction;

determining, on the projection surface, a shape of a second projection image including a portion of a rectangular first display image having a second side orthogonal to the first direction and a third side orthogonal to the second direction;

projecting the second projection image from the first projector onto the projection surface;

projecting a third projection image onto the projection surface from a second projector including a rectangular second display panel having an eleventh side orthogonal to a third axis;

calculating, based on the parameter, a third direction toward one end of a fourth axis corresponding to the third axis in the third projection image; and calculating a fourth direction that is an average of the first direction and the third direction, wherein when an image is projected onto the projection surface by the first projector and the second projector, the second direction is orthogonal to the normal direction and the fourth direction.

2. The projection image adjustment method according to claim 1, wherein the second projection image is projected onto the projection surface via a lens, the first display panel has a fourth side forming a right angle with the first side, a fifth side forming a right angle with the fourth side, and a sixth side forming a right angle with the fifth side and forming a right angle with the first side, and the first axis is an axis that passes an intersection between an optical axis of the lens and the first display panel and is parallel to the fourth side and the sixth side.

3. The projection image adjustment method according to claim 1, wherein the first projection image has a seventh side, an eighth side coupled to the seventh side, a ninth side coupled to the eighth side, and a tenth side coupled to the ninth side and the seventh side, and the second axis is an axis passing a midpoint of the seventh side and a midpoint of the ninth side of the first projection image on the projection surface.

4. The projection image adjustment method according to claim 1, further comprising:

determining, on the projection surface, a shape of a fourth projection image including a portion of a rectangular second display image having a second side orthogonal to the fourth direction and a third side orthogonal to the second direction, and a shape of a fifth projection image including a remaining portion of the second display image; and when an image is projected onto the projection surface by the first projector and the second projector, projecting the fourth projection image from the first projector, and projecting the fifth projection image from the second projector.

5. A projection system comprising:

a first projector including a rectangular first display panel having a first side orthogonal to a first axis;

a sensor configured to measure a three-dimensional shape of a projection surface onto which the first projector projects a first projection image; and an information processing apparatus configured to calculate, based on measurement data acquired from the sensor, a parameter related to the three-dimensional shape, calculate, based on the parameter, a normal direction of the projection surface, calculate, based on the parameter, a first direction corresponding to the first axis and parallel to a second axis in the first projection image, calculate a second direction orthogonal to the normal direction and the first direction, determine, on the projection surface, a shape of a second projection image including a portion of a rectangular first display image having a second side orthogonal to the first direction and a third side orthogonal to the second direction, project the second projection image from the first projector onto the projection surface, project a third projection image onto the projection surface from a second projector including a rectangular second display panel having an eleventh side orthogonal to a third axis;

calculate, based on the parameter, a third direction toward one end of a fourth axis corresponding to the third axis in the third projection image; and calculate a fourth direction that is an average of the first direction and the third direction, wherein when an image is projected onto the projection surface by the first projector and the second projector, the second direction is orthogonal to the normal direction and the fourth direction.

6. A non-transitory computer-readable storage medium storing an information processing program, the information processing program comprising:

causing a computer to calculate, based on measurement data acquired from a sensor that measures a three-dimensional shape of a projection surface onto which a first projection image is projected by a first projector including a rectangular first display panel having a first side orthogonal to a first axis, a parameter related to the three-dimensional shape, calculate, based on the parameter, a normal direction of the projection surface, calculate, based on the parameter, a first direction corresponding to the first axis and parallel to a second axis in the first projection image, calculate a second direction orthogonal to the normal direction and the first direction, determine, on the projection surface, a shape of a second projection image including a portion of a rectangular first display image having a second side orthogonal to the first direction and a third side orthogonal to the second direction, project the second projection image from the first projector onto the projection surface, project a third projection image onto the projection surface from a second projector including a rectangular second display panel having an eleventh side orthogonal to a third axis;

calculate, based on the parameter, a third direction toward one end of a fourth axis corresponding to the third axis in the third projection image; and calculate a fourth direction that is an average of the first direction and the third direction, wherein when an image is projected onto the projection surface by the first projector and the second projector, the second direction is orthogonal to the normal direction and the fourth direction.

* * * * *